United States Patent
Aoki

(10) Patent No.: US 8,111,721 B2
(45) Date of Patent: Feb. 7, 2012

(54) MULTIPLEXING APPARATUS AND METHOD

(75) Inventor: Keisuke Aoki, Tokyo (JP)

(73) Assignee: Sony Corporation, Tokyo (JP)

( * ) Notice: Subject to any disclaimer, the term of this patent is extended or adjusted under 35 U.S.C. 154(b) by 1593 days.

(21) Appl. No.: 10/612,188

(22) Filed: Jul. 2, 2003

(65) Prior Publication Data

US 2004/0008739 A1    Jan. 15, 2004

(30) Foreign Application Priority Data

Jul. 4, 2002   (JP) .............................. P2002-196276
May 15, 2003  (JP) .............................. 2003-137766

(51) Int. Cl.
*H04J 3/04*    (2006.01)
*H04J 3/02*    (2006.01)
*G06F 13/28*   (2006.01)
*G06F 13/36*   (2006.01)

(52) U.S. Cl. ............ 370/532; 370/537; 710/22; 710/25; 710/308

(58) Field of Classification Search .................. 370/412, 370/474, 415, 417, 428, 429, 381–383, 532–541; 18/535, 412, 537, 474, 381
See application file for complete search history.

(56) References Cited

U.S. PATENT DOCUMENTS

| | | | | |
|---|---|---|---|---|
| 6,188,703 | B1 * | 2/2001 | Dobson et al. ................. | 370/537 |
| 6,792,006 | B1 * | 9/2004 | Kumaki et al. ................ | 370/537 |
| 6,868,096 | B1 * | 3/2005 | Hayashi ......................... | 370/535 |
| 2001/0024456 | A1 * | 9/2001 | Zaun et al. ..................... | 370/535 |
| 2001/0036355 | A1 * | 11/2001 | Kelly et al. ..................... | 386/52 |
| 2002/0012361 | A1 * | 1/2002 | Houtepen et al. ............ | 370/474 |
| 2002/0126711 | A1 * | 9/2002 | Robinett et al. .............. | 370/535 |
| 2003/0140212 | A1 * | 7/2003 | Stein et al. ..................... | 712/22 |
| 2003/0140353 | A1 * | 7/2003 | Hugenberg et al. ........... | 725/148 |

FOREIGN PATENT DOCUMENTS

| | | |
|---|---|---|
| EP | 0 932 307 | 7/1999 |
| JP | 09-261192 | 10/1997 |
| JP | 11-234634 | 8/1999 |
| JP | 11-340936 | 12/1999 |

OTHER PUBLICATIONS

Wasilewski A J: "The MPEG-2 Systems Specification: A Common Transport for the Digital Highway" Annual Review of Communications, National Engineering Consortium, Chicago, IL, US, vol. 50, 1997, pp. 785-795, XP000720947 ISSN: 0086-229X.

Sarginson P A: "MPEG-2: a tutorial introduction to the systems layer" IEE, 1995, pp. 4-1, XP006529329 London.

* cited by examiner

*Primary Examiner* — Seema S Rao
*Assistant Examiner* — Christine Duong
(74) *Attorney, Agent, or Firm* — Frommer Lawrence & Haug LLP; William S. Frommer; Ellen Marcie Emas

(57) ABSTRACT

A multiplexing system (10) is provided which includes a plurality of encoders (12-15) which generates elementary streams, respectively, CPU (16), multiplexer (17), instruction memory (18), and a data memory (19) which stores a plurality of elementary data to be multiplexed. Each of the encoders (12-15) divides elementary data into units, and stores the data into the data memory (19). The CPU (16) generates, for each of the data units, instruction data having stated therein a storage location in the data memory (19) and stores the instruction data into the instruction memory (18). The multiplexer (17) reads the instruction data one by one from the instruction memory (18), and reads data units stated in the instruction data sequentially from the data memory (19), for generation of a multiplexed stream. Thus, the burden of processing to the controller can be lessened.

50 Claims, 24 Drawing Sheets

| NO. OF INSTRUCTIONS=6 | OUTPUT TARGET=MS0 | |
|---|---|---|
| MUX_I(H0)<br>Ah0 | Sh0<br>Nh0 | ⎫<br>⎬ IST#0<br>⎪ |
| MUX_I(A0)<br>Aa0 | Sa0<br>Na0 | |
| MUX_I(V0)<br>Av0 | Sv0<br>Nv0 | |
| MUX_I(H1)<br>Ah1 | Sh0<br>Nh1 | |
| MUX_I(A1)<br>Aa0 | Sa0<br>Na1 | |
| MUX_I(V1)<br>Av1 | Sv0<br>Nv1 | ⎭ |
| NO. OF INSTRUCTIONS=6 | OUTPUT TARGET=MS1 | |
| MUX_I(H2)<br>Ah2 | Sh1<br>Nh2 | ⎫<br>⎬ IST#1<br>⎪ |
| MUX_I(A2)<br>Aa0 | Sa1<br>Na2 | |
| MUX_I(V2)<br>Av2 | Sv1<br>Nv2 | |
| MUX_I(H3)<br>Ah3 | Sh1<br>Nh3 | |
| MUX_I(A3)<br>Aa3 | Sa1<br>Na3 | |
| MUX_I(V3)<br>Av3 | Sv1<br>Nv3 | ⎭ |

ORDER OF EXECUTION ↓

FIG.9

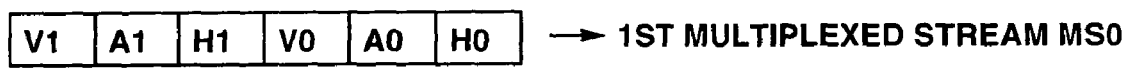 → 1ST MULTIPLEXED STREAM MS0
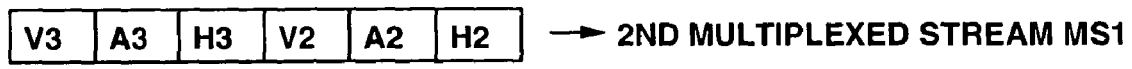 → 2ND MULTIPLEXED STREAM MS1
FIG.10

MULTIPLEXING APPARATUS AND METHOD

BACKGROUND OF THE INVENTION

1. Field of the Invention

The present invention relates to an apparatus for, and a method of, multiplexing video and audio data from a plurality of channels.

This application claims the priority of the Japanese Patent Application Nos. 2002-196276 filed on Jul. 4, 2002 and 2003-137766 filed on May 15, 2003, the entirety of which is incorporated by reference herein.

2. Description of the Related Art

Generally, for distribution of digital contents over a network, a multiplexer is used to multiplex a plurality of elementary streams such as video data, audio data, text data, program data and other system data necessary for data transmission.

Reference cited 1: Japanese Unexamined Application Publication No. 261192 of 1997
Reference cited 2: Japanese Unexamined Application Publication No. 340936 of 1999
Reference cited 3: Japanese Unexamined Application Publication No. 234634 of 1999

Conventionally, the multiplexer used for data distribution over a network includes a random access memory (RAM) which stores elementary streams supplied from a plurality of encoders, a dynamic memory access (DMA) circuit which reads elementary streams stored in RAM and delivers the data at the output terminal thereof, and a central processing unit (CPU) (see the patent documents 1 to 3). In the conventional multiplexer constructed as above, CPU always monitors the elementary streams stored in RAM, and supplies a data transfer command to DMA at a time for the data stored in RAM to be outputted. Upon reception of the transfer command from CPU, DMA will read data from an address designated by CPU and transfer the read data to outside. Thus, in such a conventional multiplexer, CPU manages data in RAM and always controls directly DMA to generate a multiplexed stream.

In the above multiplexer, however, an extremely heavy processing-operation burden is imposed on CPU.

Also, arbitrary operations of data processing are effected synchronously with outputting of a multiplexed stream in some cases. Such arbitrary operations include, for example, various kinds of data processing, such as insertion of dummy data called stuffing data or padding data to a specific position in a multiplexed stream, deletion, immediately before outputting, of data in a specific position in the multiplexed stream, insertion of arbitrary data such as concurrent output time information etc. to a specific position in the multiplexed stream, sending of a timing of supplying data at a specific position in the multiplexed stream to CPU or outside.

On this account, it is a common practice that an identifier, command or the like other than elementary data is pre-inserted in a specific position in a multiplexed stream, such an identifier or the like is detected at the output stage of the multiplexer and the above operations of data processing are started at a position in the multiplexed stream where the identifier is detected.

In case an identifier is inserted in a multiplexed stream, however, there is a possibility that a row of elementary data itself will be wrongly recognized by as an identifier.

To prevent such wrong recognition, it is possible to limit the position where an identifier is inserted, namely, to insert an identifier only at the top of a packet or pack for example. However, this measure will disadvantageously limit the flexibility of a position where data processing is to be started.

Alternatively, it is possible to hold an address of a position where an identifier is inserted in a separate register or the like. With this measure, however, the number of registers in the apparatus will disadvantageously limit the number of identifiers that can be inserted for a fixed period.

Also in the multiplexer, CPU always manages directly the data amount in RAM (RAM occupancy) so that elementary streams supplied from each encoder and stored in RAM will not overflow or underflow.

In case CPU makes the direct and continuous management of the RAM occupancy, however, a very heavy processing-operation burden will be imposed on CPU.

Further, simultaneous outputting of a plurality of multiplexed streams needs multiplexers for the output multiplexed streams, respectively. For example, for recording multiplexed a multiplexed stream of a content to a hard disk while distributing another multiplexed stream of the same content over a network, there have to be built two multiplexers, one of which is a multiplexer which generates a multiplexed stream for transfer to the hard disk and the other is a multiplexer which generates a multiplexed stream for distribution over the network.

However, a system using the two multiplexers as above needs as many CPUs, DMAs and others as the multiplexers, which will lead to an increased scale of the hardware.

OBJECT AND SUMMARY OF THE INVENTION

It is therefore an object of the present invention to overcome the abovementioned drawbacks of the related art by providing a multiplexing apparatus and method, in which a controller can operate with less processing-operation burden thereon.

It is another object of the present invention to provide a multiplexing apparatus and method, capable of processing data synchronously with outputting of a multiplexed stream and in a more flexible timing of processing.

It is further object of the present invention to provide a multiplexing apparatus and method, capable of outputting a plurality of multiplexed streams by a circuit reduced in scale.

The above object can be attained by providing a multiplexer which multiplexes a plurality of elementary data streams to generate one multiplexed stream, the apparatus including according to the present invention, a memory which stores a supplied plurality of elementary data streams; an instruction generating means for generating multiplexing instruction data having stated therein a storage location, in the memory, of a data unit composed of successive elementary data streams each in an arbitrary amount correspondingly to each data unit and storing the generated multiplexing instruction data into the memory in an order of multiplexing corresponding data units; and a multiplexed stream generating means for generating one multiplexed stream by reading the multiplexing instruction data sequentially one by one from the memory, reading the data units sequentially from the storage locations stated in the read multiplexing instruction data and by outputting the read data units.

In the above multiplexer, the multiplexing instruction data having stated therein an order of multiplexing is generated and stored into the memory, and elementary data streams are multiplexed sequentially in the order stated in the multiplexing instruction data stored in the memory.

Also, the above object can be attained by providing a multiplexer which multiplexes a plurality of elementary data streams to generate one multiplexed stream, the apparatus including according to the present invention, a memory which stores a supplied plurality of elementary data streams; an instruction generating means for generating multiplexing instruction data having stated therein a storage location, in the memory, of a data unit composed of successive elementary data streams each in an arbitrary amount correspondingly to each data unit while generating command instruction data having stated therein an instruction for execution of a data processing to be executed in an arbitrary position in the multiplexing instruction data, and storing the generated multiplexing instruction data and command instruction data into the memory in an order of multiplexing data units and execution instruction; a multiplexed stream generating means for generating one multiplexed stream including the elementary data streams and command data by reading the multiplexing instruction data and command instruction data sequentially one by one from the memory, reading the data units sequentially from the storage locations stated in the read multiplexing instruction data and outputting the read data units, when having read the multiplexing instruction data, or by outputting command data having stated therein the execution instruction stated in the command instruction data, when having read the command instruction data; and a command executing means which is supplied with a multiplexed stream output from the multiplexed stream generating means and makes a processing corresponding to an instruction content stated in the command data when the data row in the input multiplexed stream is command data, or outputs the input multiplexed stream as it is when the data row in the input multiplexed stream is the elementary data stream.

In the above multiplexer, the multiplexing instruction data having an order of multiplexing stated therein and command instruction data having a predetermined data execute instruction stated therein are generated and stored into the memory, and data are multiplexed and processed according to the multiplexing instruction data and command instruction data stored in the memory.

Also, the above object can be attained by providing a multiplexer which multiplexes a plurality of elementary data streams to generate one multiplexed stream, the apparatus including according to the present invention, a memory which stores a supplied plurality of elementary data streams; a counting means for indicating a count which indicates a data occupancy of the memory; an instruction generating means for generating multiplexing instruction data having stated therein a storage location, in the memory, of a data unit composed of successive elementary data streams each in an arbitrary amount correspondingly to each data unit and storing the generated multiplexing instruction data into the memory in an order of multiplexing corresponding data units; and a multiplexed stream generating means for generating one multiplexed stream by reading the multiplexing instruction data sequentially one by one from the memory, reading the data units sequentially from the storage locations stated in the read multiplexing instruction data and by outputting the read data units; the instruction generating means adding the data amount of a data unit corresponding to the generated multiplexing instruction data to the count; and the counting means subtracting the data amount of output data unit from the count.

In the above multiplexer, the multiplexing instruction data having stated therein an order of multiplexing is generated and stored into the memory, and elementary data streams are multiplexed sequentially in the order stated in the multiplexing instruction data stored in the memory. Further, in the above multiplexer, the data amount of a data unit correspondingly to the generated multiplexing instruction data is added to the count, and data amount of output data unit is subtracted from the count.

Also, the above object can be attained by providing a multiplexer which multiplexes a plurality of elementary data streams to generate a plurality of multiplexed streams, the apparatus including according to the present invention, a memory which stores a supplied plurality of elementary data streams; an instruction generating means for generating multiplexing instruction data having stated therein a storage location, in the memory, of a data unit composed of successive elementary data streams each in an arbitrary amount correspondingly to each data unit and storing the generated multiplexing instruction data into the memory in an order of multiplexing corresponding data units; and a multiplexed stream generating means for generating a plurality of multiplexed streams by reading the multiplexing instruction data sequentially one by one from the memory, reading the data units sequentially from the storage locations stated in the read multiplexing instruction data and by outputting the read data units; the instruction generating means stating, in the multiplexing instruction data, the type of a multiplexed stream resulted from multiplexing data units corresponding to the generated multiplexing instruction data; and the multiplexed stream generating means generating the plurality of multiplexed streams by switching the outputting of the read data unit correspondingly to the multiplexed stream type stated in the read multiplexing instruction data.

In the above multiplexer, the multiplexing instruction data having stated therein an order of multiplexing is generated and stored into the memory, and elementary data streams are multiplexed sequentially in the order stated in the multiplexing instruction data stored in the memory. Further, in the above multiplexer, the multiplexed stream type is stated in the multiplexing instruction data and outputting is switched correspondingly to the multiplexed stream type.

Also, the above object can be attained by providing a multiplexing method in which a plurality of elementary data streams is multiplexed to generate one multiplexed stream, the method including, according to the present invention, the steps of supplying a plurality of elementary data streams and storing the supplied elementary data streams into a memory; generating multiplexing instruction data having stated therein a storage location, in the memory, of a data unit composed of successive elementary data streams each in an arbitrary amount correspondingly to each data unit and storing the generated multiplexing instruction data into the memory in an order of multiplexing corresponding data units; and generating one multiplexed stream by reading the multiplexing instruction data sequentially one by one from the memory, reading the data units sequentially from the storage locations stated in the read multiplexing instruction data and by outputting the read data units.

In the above multiplexing method, the multiplexing instruction data having stated therein an order of multiplexing is generated and stored into the memory, and elementary data streams are multiplexed sequentially in the order stated in the multiplexing instruction data stored in the memory.

Also, the above object can be attained by providing a multiplexing method in which a plurality of elementary data streams is multiplexed to generate one multiplexed stream, the method including, according to the present invention, the steps of supplying a plurality of elementary data streams and storing the supplied elementary data streams into a memory; generating multiplexing instruction data having stated therein a storage location, in the memory, of a data unit composed of successive elementary data streams each in an arbitrary amount correspondingly to each data unit while generating command instruction data having stated therein an instruction for execution of a data processing to be executed in an arbitrary position in the multiplexing instruction data, and storing the generated multiplexing instruction data and command instruction data into the memory in an order of multiplexing data units and execution instruction; generating one multiplexed stream including the elementary data streams and command data by reading the multiplexing instruction data and command instruction data sequentially one by one from the memory, reading the data units sequentially from the storage locations stated in the read multiplexing instruction data and outputting the read data units, when having read the multiplexing instruction data, or by outputting command data having stated therein the execution instruction stated in the command instruction data, when having read the command instruction data; and being supplied with a multiplexed stream output from the multiplexed stream generating means and making a processing corresponding to an instruction content stated in the command data when the data row in the input multiplexed stream is command data, or outputting the input multiplexed stream as it is when the data row in the input multiplexed stream is elementary data stream.

In the above multiplexing method, the multiplexing instruction data having an order of multiplexing stated therein and command instruction data having a predetermined data execute instruction stated therein are generated and stored into the memory, and data are multiplexed and processed according to the multiplexing instruction data and command instruction data stored in the memory.

Also, the above object can be attained by providing a multiplexing method in which a plurality of elementary data streams is multiplexed to generate one multiplexed stream, the method including, according to the present invention, the steps of supplying a plurality of elementary data streams and storing the supplied elementary data into a memory; generating multiplexing instruction data having stated therein a storage location, in the memory, of a data unit composed of successive elementary data streams each in an arbitrary amount correspondingly to each data unit and storing the generated multiplexing instruction data into the memory in an order of multiplexing corresponding data units; and generating one multiplexed stream by reading the multiplexing instruction data sequentially one by one from the memory, reading the data units sequentially from the storage locations stated in the read multiplexing instruction data and by outputting the read data units; in the instruction generating step, there being added the data amount of a data unit corresponding to the generated multiplexing instruction data to a count in a counter indicating data occupancy of the memory; and the data amount of data unit output from the memory being subtracted from the count.

In the above multiplexing method, the multiplexing instruction data having stated therein an order of multiplexing is generated and stored into the memory, and elementary data streams are multiplexed sequentially in the order stated in the multiplexing instruction data stored in the memory. Further, in the above multiplexing method, the data amount of a data unit corresponding to the generated multiplexing instruction data is added to the count, and data amount of output data unit is subtracted from the count.

Also, the above object can be attained by providing a multiplexing method in which a plurality of elementary data streams is multiplexed to generate a plurality of multiplexed streams, the method including, according to the present invention, the steps of supplying a plurality of elementary data streams and storing the supplied elementary data streams into a memory; generating multiplexing instruction data having stated therein a storage location, in the memory, of a data unit composed of successive elementary data streams each in an arbitrary amount correspondingly to each data unit and storing the generated multiplexing instruction data into the memory in an order of multiplexing corresponding data units; stating, in the multiplexing instruction data, the type of a multiplexed stream resulted from multiplexing data units corresponding to the generated multiplexing instruction data; and generating a plurality of multiplexed streams by reading the multiplexing instruction data sequentially one by one from the memory, reading the data units sequentially from the storage locations stated in the read multiplexing instruction data and by outputting the read data units and by switching the outputting of the read data unit correspondingly to the multiplexed stream type stated in the read multiplexing instruction data.

In the above multiplexing method, the multiplexing instruction data having stated therein an order of multiplexing is generated and stored into the memory, and elementary data streams are multiplexed sequentially in the order stated in the multiplexing instruction data stored in the memory. Further, in the above multiplexing method, the multiplexed stream type is stated in the multiplexing instruction data and outputting is switched correspondingly to the multiplexed stream type.

These objects and other objects, features and advantages of the present invention will become more apparent from the following detailed description of the preferred embodiments of the present invention when taken in conjunction with the accompanying drawings.

BRIEF DESCRIPTION OF THE DRAWINGS

FIG. 9 shows the instruction sets which are when the data units shown in FIG. 8 are multiplexed;

FIG. 10 shows a multiplexed stream which is when the instruction sets shown in FIG. 9 are executed;

DETAILED DESCRIPTION OF THE PREFERRED EMBODIMENTS

First Embodiment

As the first embodiment of the present invention, there will be described herebelow a multiplexing system which multiplexes video and audio data into two multiplexed streams (first and second, MS0 and MS1) intended for distribution over a network and outputs the multiplexed streams simultaneously.

Figure 1:
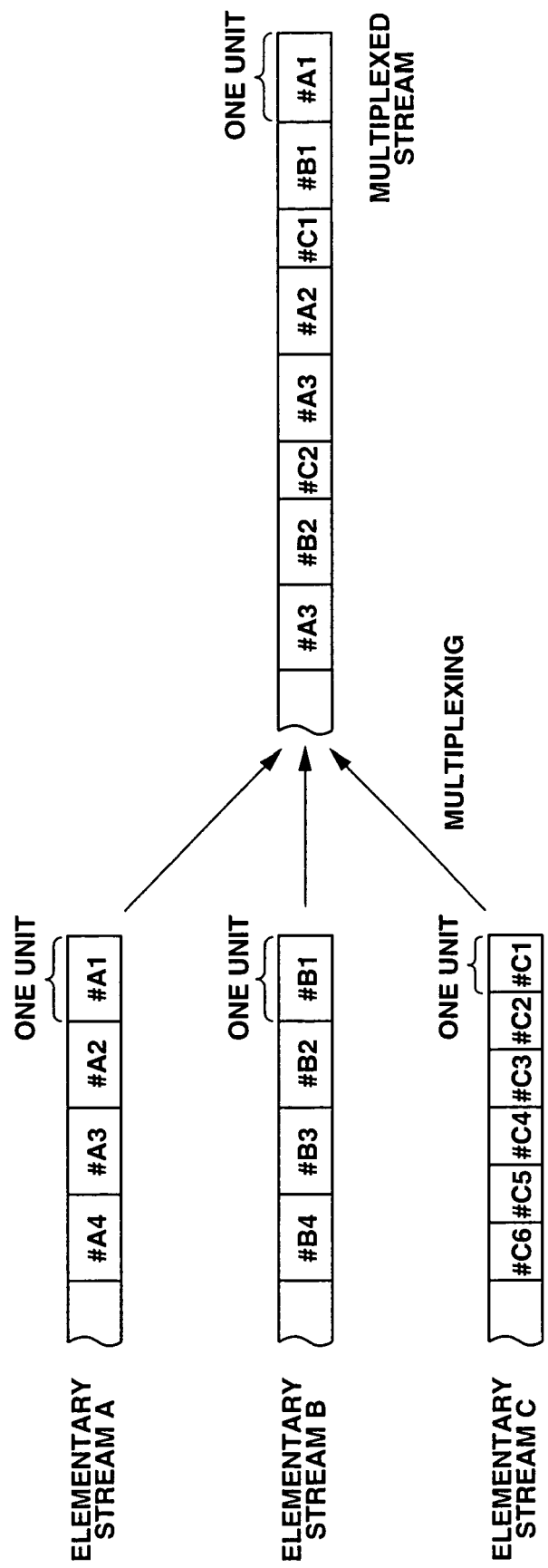
FIG. 1 explains the multiplexing by the multiplexing system according to the present invention.

Note that the multiplexing system generates the multiplexed streams by dividing a plurality of sequential data streams as elementary data streams into predetermined data units and multiplexing the divisional data units of the data streams by time as shown in FIG. 1. For the convenience of explanation of the present invention, the divisional data unit will be defined as "units".

(Overall Construction of the Multiplexing System)

Figure 2:
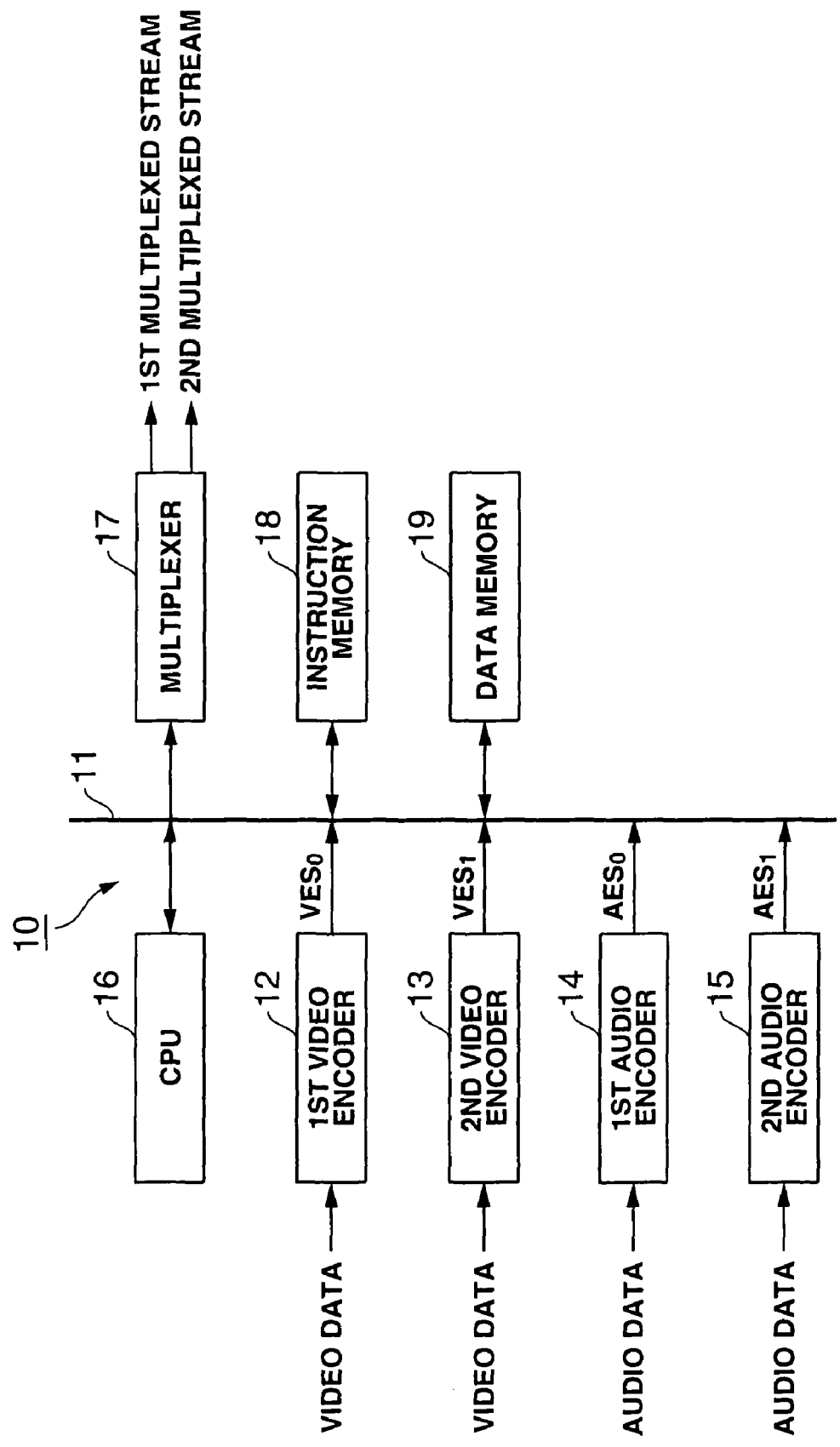
FIG. 2 is a block diagram of a first embodiment of the multiplexing system according to the present invention.

As shown in FIG. 2, the multiplexing system, generally indicated with a reference 10, as the first embodiment of the present invention, includes a data bus 11, and also first and second video encoders 12 and 13, first and second audio encoders 14 and 15, CPU (central processing unit) 16, multiplexer 17, instruction memory 18 and a data memory 19, all connected to the data bus 11.

The first and second video encoders 12 and 13 are supplied with base-band video data coming from a video source, and generates video elementary streams (will be referred to simply as "video streams" hereunder) VES0 and VES1 by compressing, by encode the video data with a predetermined encoding technique such as MPEG-2 or MPEG-4. The first and second video encoders 12 and 13 divide the generated video streams VES0 and VES1 into units, and store each of the divisional units into the data memory 19 via the data bus 11. Also, the first and second video encoders 12 and 13 generate system information on the generated video streams VES0 and VES1 and which are necessary for multiplexing the video streams. The video encoders 12 and 13 supply the system information and storage location information (address where recording of the unit is started, and byte length of the unit) having state therein the storage location of each unit in the data memory 19 to the CPU 16 via the data bus 11.

The first and second audio encoders 14 and 15 are supplied with the base-band audio data coming from an audio source, and generates audio elementary streams (will be referred to simply as "audio streams" hereunder) AES0 and AES1 by compressing, by encoding the audio data with a predetermined encoding technique such as MPEG-2 or MPEG-4. The first and second audio encoders 14 and 15 divide the generated audio streams AES0 and AES1 into units, and store each of the divisional units into the data memory 19 via the data bus 11. Also, the first and second audio encoders 14 and 15 generate system information on the generated audio streams AES0 and AES1 and which are necessary for multiplexing the video streams. The audio encoders 14 and 15 supply the system information and storage location information (address where recording of the unit is started and byte length of the unit) having state therein the storage location of each unit in the data memory 19 to the CPU 16 via the data bus 11.

The CPU 16 controls the multiplexing system 10 as a whole. The CPU 16 generates header data, information data, etc. as elementary data of the first and second multiplexed streams MS0 and MS1. The "header data" include a variety of header information such as PS header, IP header, RTP header, etc. defined in MPEG-2 or MPEG-4, for example, and the "information data" include PSI (program system information), SI (service information, etc. defined in the multiplexing technique such as MPEG-2 system. It should be noted that the elementary data other than the audio and video streams, such as the header data, information data, etc. will generally be called "header data" herein. The CPU 16 makes reference to the system information supplied from each of the encoders 12 to 15 and generates header data HS0 corresponding to the type (such as PS (program stream), TS (transport stream), RTP (real-time packet)) of the first multiplexed stream MS0 and header data HS1 corresponding to the type of the second multiplexed stream MS1. The CPU 16 divides the generated header data HS0 and HS1 into units, and stores the units into the data memory 19 via the data bus 11.

Also, the CPU 16 generates an instruction set in which unit storage location and order of multiplexing the units are stated on the basis of the storage location information on each elementary stream, supplied from the encoders 12 to 15, and storage location information having stated therein unit storage location of the header data generated by itself. The CPU 16 stores the generated instruction set into the instruction memory 18 via the data bus 11. It should be noted that the instruction set will be described in detail later.

Also, the CPU 16 adds a predetermined value to a counter included in the multiplexer 17 each time it has generated one instruction set. It should be noted that the addition will also be described in detail later.

The multiplexer 17 generates the first multiplexed stream MS0 by multiplexing the video stream VES0, audio stream AES0 and header data HS0, and also generates the second multiplexed stream MS1 by multiplexing the video stream VES1, audio stream AES1 and header data HS1. The multiplexer 17 generates the first and second multiplexed streams MS0 and MS1 simultaneously and supplies these two streams to outside simultaneously.

The multiplexer 17 reads the instruction set from the instruction memory 18 via the data bus 11. Then, according to the information stated in the instruction set, the multiplexer 17 sequentially reads the elementary data in units from the data memory 19, and sequentially outputs the units, to thereby generate the first and second multiplexed streams MS0 and MS1.

The instruction memory 18 is a circuit which stores the instruction set. The instruction set is written by the CPU 16 to the instruction memory 18 and read by the multiplexer 17 from the instruction memory 18.

The data memory 19 is a circuit which stores the video streams VES0 and VES1 generated by the first and second video encoders 12 and 13, audio streams AES0 and AES1 generated by the first and second audio encoders 14 and 15, and the header data generated by the CPU 16. These various types of data stored in the data memory 19 are read by the multiplexer 17.

Figure 3:
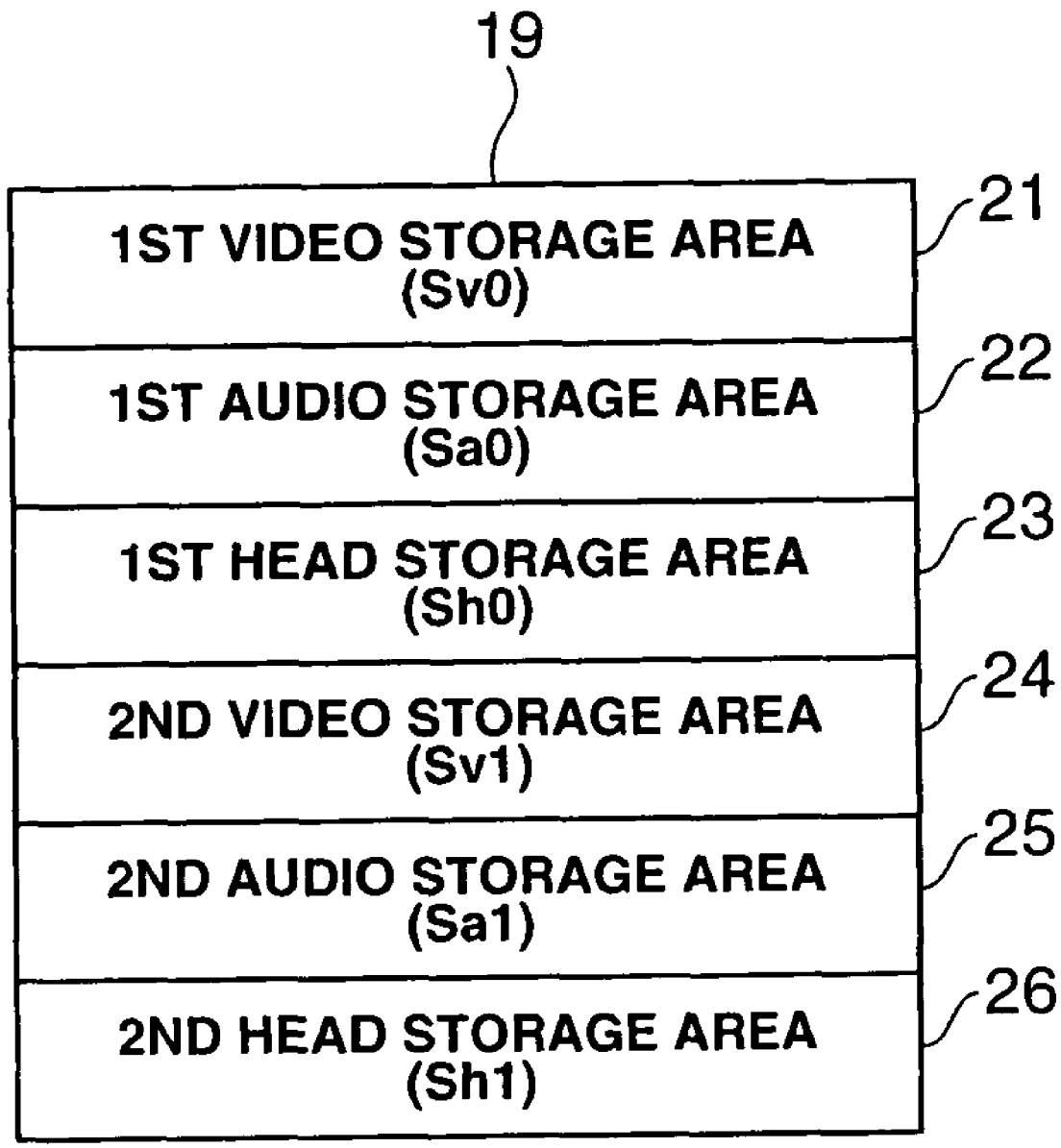
FIG. 3 explains each of areas in a data memory in the above multiplexing system.

Note that the data memory 19 has the recording area thereof divided correspondingly to the types the elementary streams and header data. In this embodiment, the recording area of the data memory 19 is divided in six areas including a first video storage area (Sv0) 21, first audio storage area (Sa0) 22, first header storage area (Sh0) 23, second video storage area (Sv1) 24, second audio storage area (Sa1) 25 and a second header storage area (Sh1) 26, as shown in FIG. 3. The first video storage area (Sv0) 21 stores the video stream VES0 supplied from the first video encoder 12, first audio storage area (Sa0) 22 stores the audio stream AES0 supplied from the first audio encoder 14, the first header storage area (Sh0) 23 stores the header data concerning the video stream VES0 and audio stream AES0, the second video storage area (Sv1) 24 stores the video stream VES1 supplied from the second vide encoder 13, the second audio storage area (Sa1) 25 stores the audio stream AES1 supplied from the second audio encoder 15, an the second header storage area (Sh1) 26 stores the header data concerning the video stream VES1 and audio stream AES1.

Figure 4:
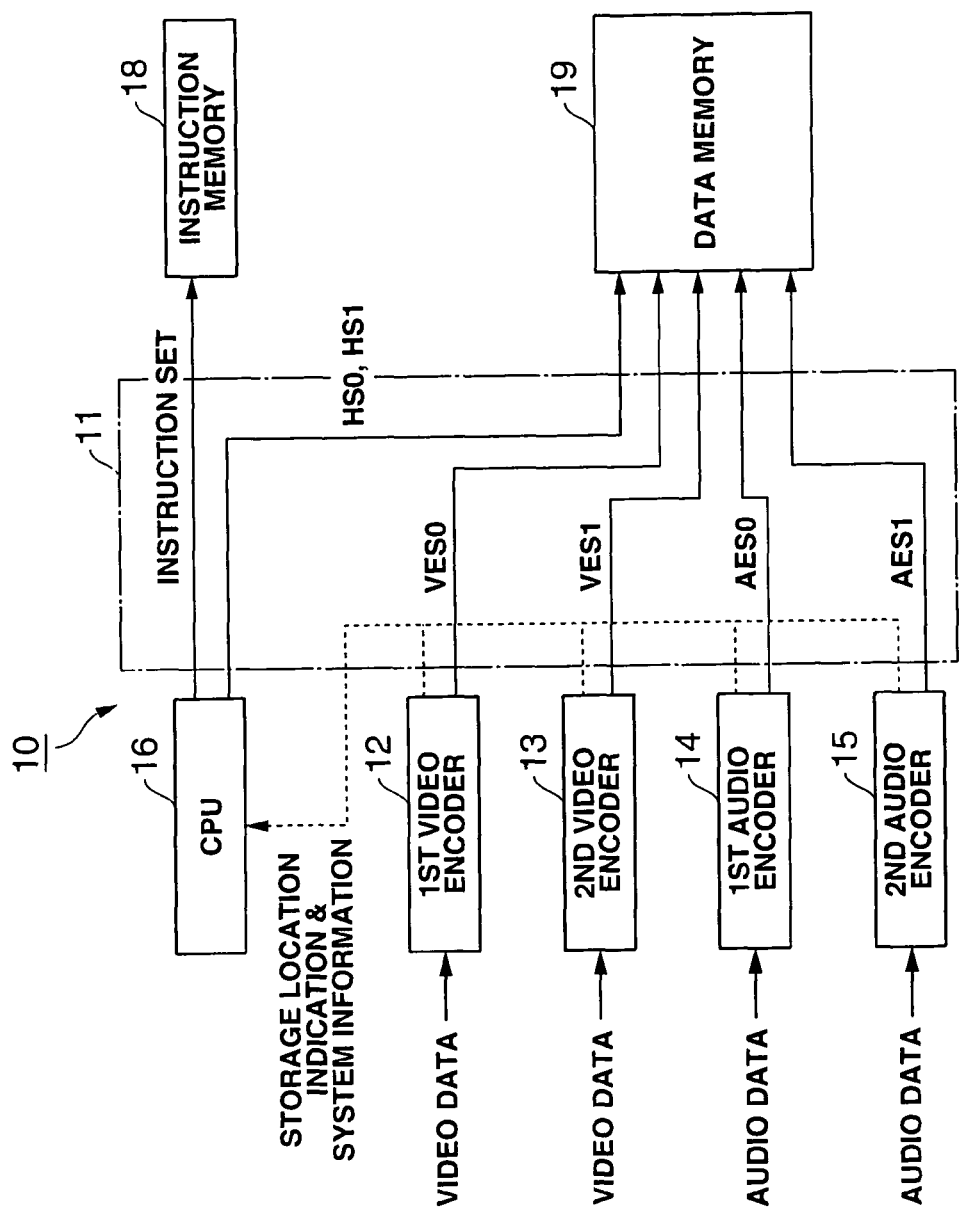
FIG. 4 explains a flow of data in encoding in the above multiplexing system.

The multiplexing system 10 constructed as above will do a series of encoding operations and a series of multiplexing operations simultaneously. In the series of encoding operations, the encoders 12 to 15 generates the elementary streams VES0, VES1, AES0, AES1, HS0 and HS1 and stores the data into the data memory 19, as shown in FIG. 4. In the series of multiplexing operations, the multiplexer 17 reads the elementary streams VES0, VES1, AES0, AES1, HS0 and HS1 are read by the multiplexer 17 from the data memory 19 and multiplexes the data as shown in FIG. 5.

Also, in the encoding operations as shown in FIG. 4, the CPU 16 will calculate an order of multiplexing the units on the basis of the storage location information and system information supplied from the encoders 12 to 15 and generates the instruction set in which the unit storage location and order of multiplexing the units are stated. Then the CPU 16 stores the generated instruction set into the instruction memory 18.

Figure 5:
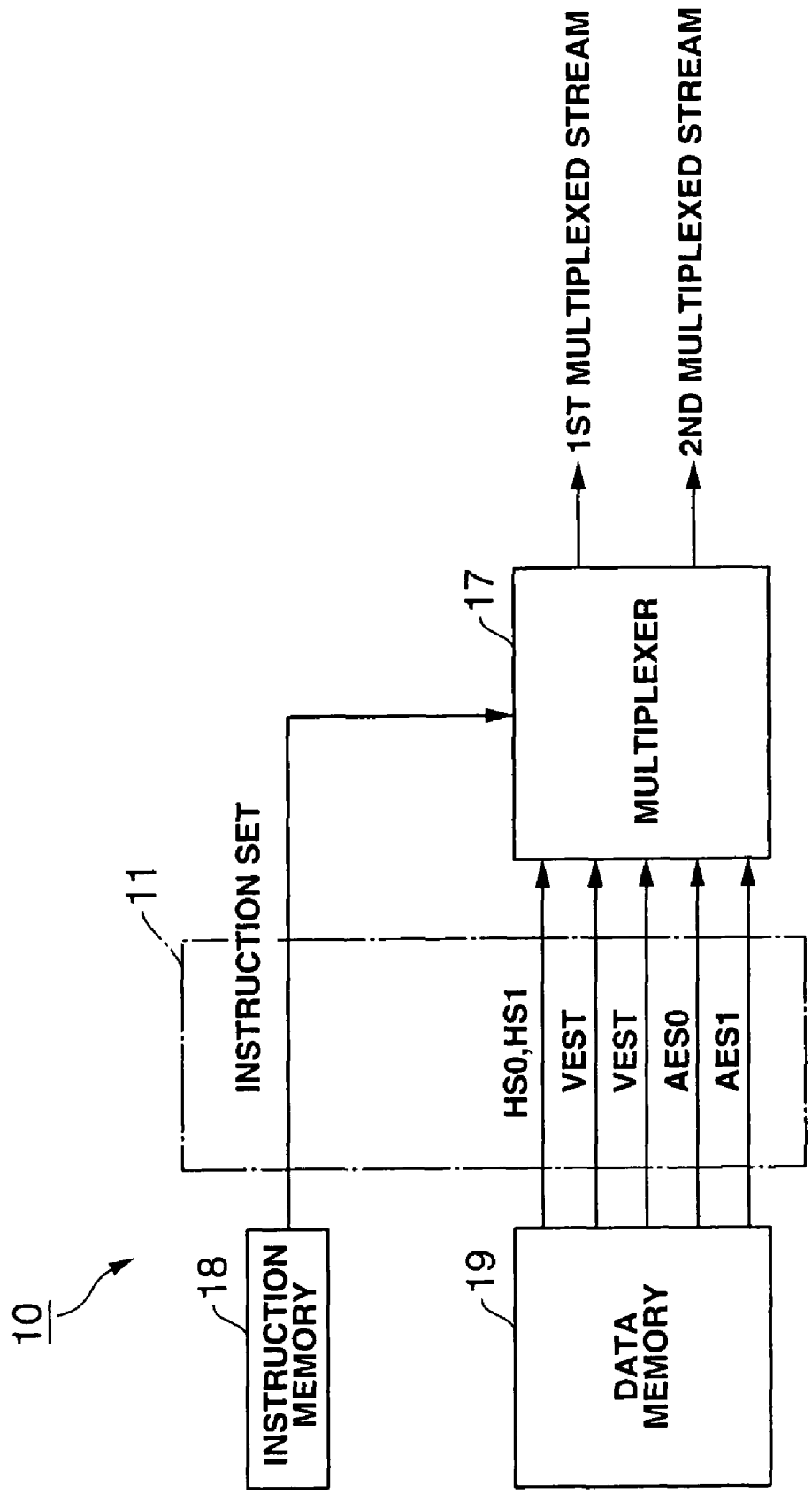
FIG. 5 explains a flow of data made in multiplexing in the above multiplexing system.

Also, the multiplexer 17 makes reference to the statement in the instruction set stored in the instruction memory 18 to read necessary data from the data memory 19 in a predetermined order for multiplexing as shown in FIG. 5.

Thus the multiplexing system 10 has not to control the timing of instruction transfer since the CPU 16 generates the instruction set and stores it into the instruction memory 18 once and the multiplexer 17 reads the instruction set from the instruction memory 18, so the CPU 16 has not to transfer an instruction directly to the multiplexer 17 at a due time of transfer. Therefore, the processing burden to the CPU 16 can be reduced.

(Instruction Set)

Figure 6:
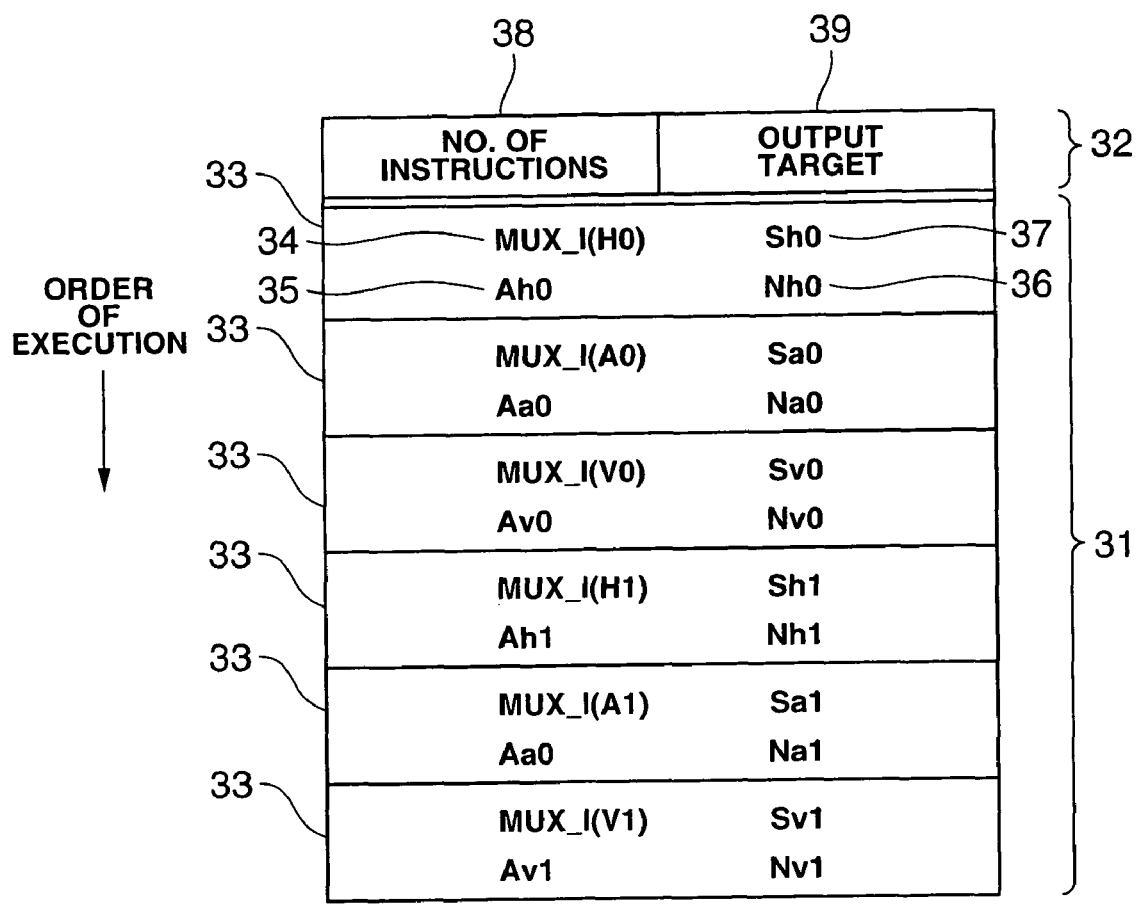
FIG. 6 shows instruction sets used in the above multiplexing system.

Next, the instruction set will be explained:

The instruction set is composed of an instruction group 31 and table information 32 as shown in FIG. 6.

In the instruction group 31, there are more than one multiplexing instruction data 33. Each of the multiplexing instruction data 33 includes necessary indication for reading one unit from the data memory 19 and supplies it as a multiplexed stream.

More specifically, the multiplexing instruction data 33 has stated therein ID information 34 indicating that the data is the multiplexing instruction data 33, information (recording start address 35 and number of bytes 36) having stated therein a storage location of a to-be-transferred unit in the data memory 19, and area information 37 indicating an area in the data memory 19 where the to-be-transferred unit is stored. Because these pieces of information are stated in the multiplexing instruction data 33, it is possible to cause the multiplexer 17 to identify one unit in the data memory 19, and read and output the identified unit. It should be noted that reference is made to the area information 37 when the counter in the multiplexer 17, which will be described in detail later, is selected.

Also, the plurality of multiplexing instruction data 33 is stated in a line, and the stated order indicates the order of multiplexing the units. Since the order of multiplexing the units is thus defined by the stated order of multiplexing instruction data 33, it is possible to cause the multiplexer 17 to control the order of transferring the units. That is, by reading and outputting the units sequentially one by one a direction from the upper-order multiplexing instruction data 33 toward the lower-order multiplexing instruction data 33, the multiplexer 17 can output a multiplexed stream in which the units are ordered correspondingly to their stated order of the multiplexing instruction data 33. It should be noted that if the multiplexing instruction data 33 are stated in an order, any order of multiplexing the units has not to be defined by the stated order. For example, a number indicating an order may be stated directly to each of the multiplexing instruction data 33.

The table information 32 has a "No. of instructions" column 38 and an "Output target" column 39.

The information in the "No. of instructions" column 38 indicates a number of multiplexing instruction data 33 stated in the instruction set in consideration. It should be noted that in case the number of multiplexing instruction data 33 stated in the instruction set is fixed, no information may be stated in the "No. of instructions" column 38.

The information in the "output target" 39 is used to identify which the multiplexing instruction data 33 is, an instruction for transfer of the first multiplexed stream MS0 or an instruction for transfer of the second multiplexed stream MS1. By stating information in the "Output target" column 39 of the table information 32, the multiplexer 17 can be made to output the plurality of multiplexed streams simultaneously in parallel just by selecting an output port for data read from the data memory 19 correspondingly to the statement in the "Output target" column 39. It should be noted that since the information in the "Output target" column 39 is controlled, so only the multiplexing instruction data 33 for the units in one multiplexed stream is stated in one instruction set.

The above instruction set is generated by the CPU 16 during encoding by the encoders 12 to 15. Since the number of multiplexing instruction data 33 that can be stated in one instruction set is limited, however, the CPU 16 stores a plurality of instruction sets successively into the instruction memory 18 for production of sequential multiplexed streams.

Figure 7:
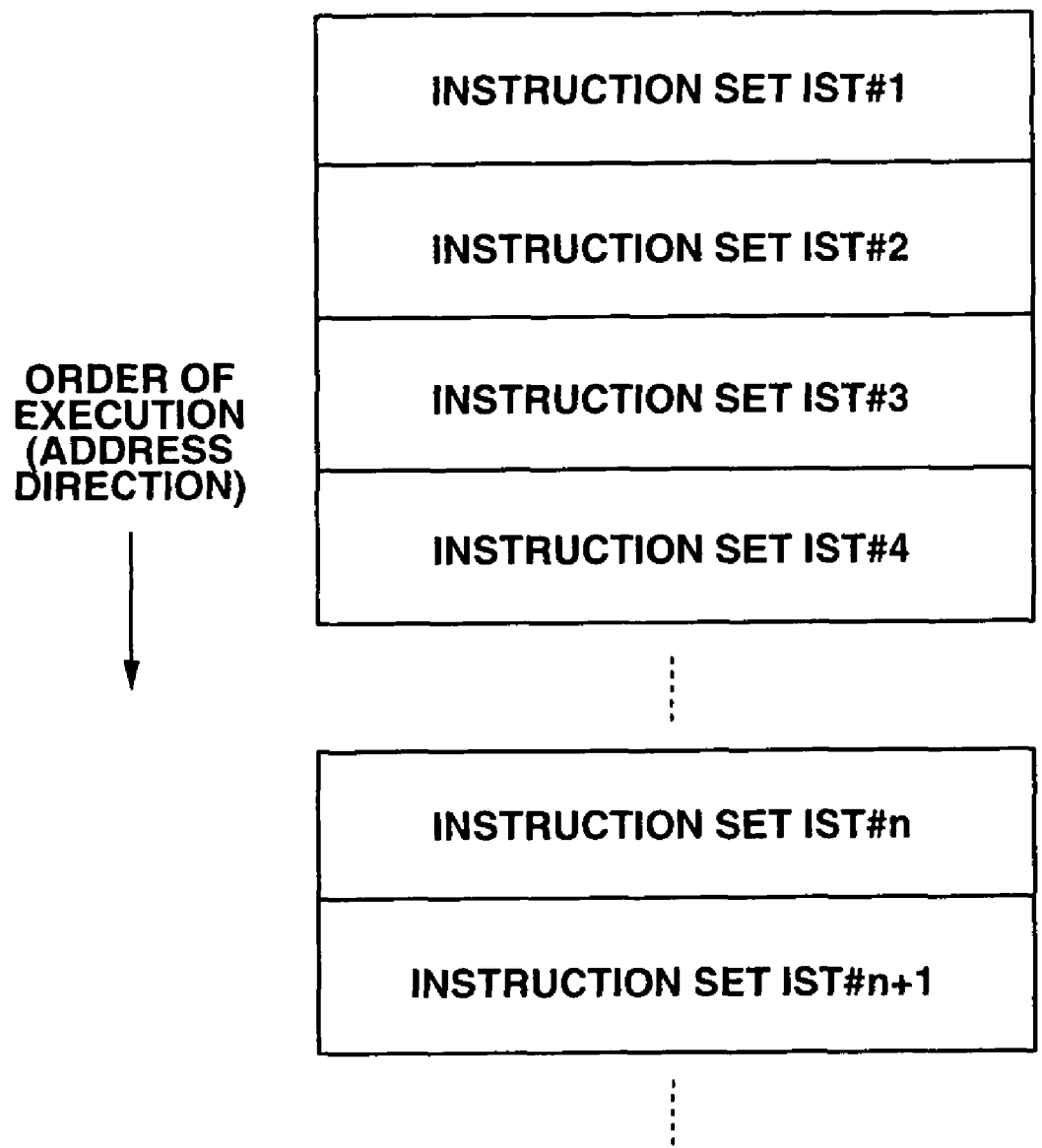
FIG. 7 shows the instruction sets successively recorded.

For example, the CPU 16 states a plurality of instruction sets successively so that they will be laid in a direction from the start address toward the end address in the instruction memory 18 as shown in FIG. 7. It should be noted that "#n" in FIG. 7 is a value indicates an order of instruction sets. When no free recording area remains in the instruction memory 18, the CPU 16 will state instruction sets over the existing ones again starting at the start address to cyclically utilize the recording area in the instruction memory 18. On the other hand, the multiplexer 17 sequentially reads the instruction sets one by one from the instruction memory 18 starting at the start address toward the end address, and sequentially executes the instruction sets one by one.

As above, by storing the instruction sets successively into the instruction memory 18, the CPU 16 can control the order of controlling the operation of the multiplexer 17. That is, by determining an order of multiplexing instruction data in the instruction set and also an order of instruction sets, the CPU 16 can control the multiplexed order of the units in the multiplexed stream.

The multiplexing operation made in the multiplexing system 10 will be described in detail herebelow with reference to FIGS. 8 to 10.

Figure 8:
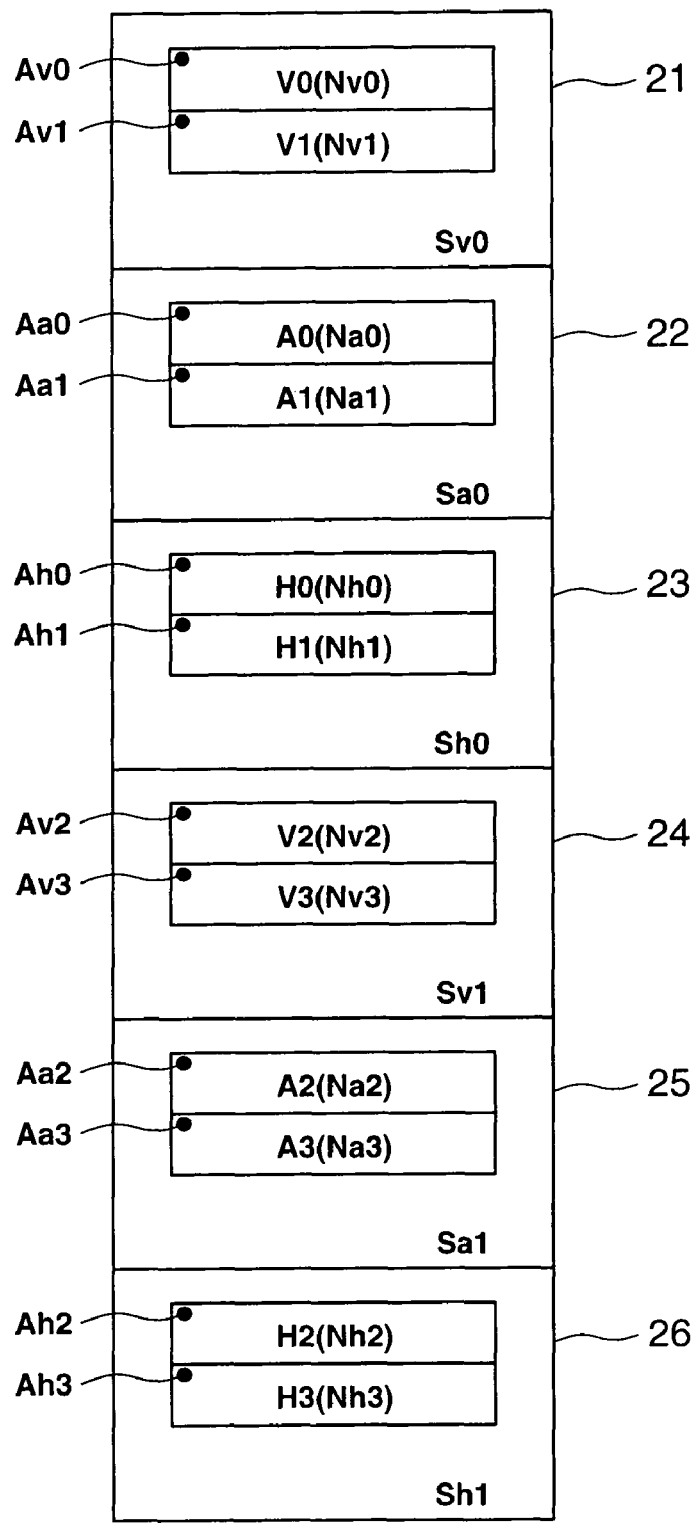
FIG. 8 shows data units recorded in each of the areas in the data memory in the above multiplexing system.

FIG. 8 shows an example storage of data units in the data memory 19, FIG. 9 shows an example statement of an instruction set, and FIG. 10 shows example data in multiplexed streams.

As shown in FIG. 8, the data memory 19 has stored therein a unit V0 (recording start address Av0 and number of bytes Nv0) and unit V1 (recording start address Av1 and number of bytes Nv1) in the first video storage area (Sv0) 21 thereof, a unit A0 (recording start address Aa0 and number of bytes Na0) and unite A1 (recording start address Aa1 and number of bytes Na1) in the first audio storage area (Sa0) 22, a unit H0 (recording start address Ah0 and number of bytes Nh0) and unit H1 (recording start address Ah1 and number of bytes Nh1) in the first header storage area (Sh0) 23, a unit V2 (recording start address Av2 and number of bytes Nv2) and unit V3 (recording start address Av3 and number bytes Nv3) in the second video storage area (Sv3) 24 thereof, a unit A2 (recording start address Aa2 and number of bytes Na2) and unit A3 (recording start address Aa3 and number of bytes Na3) in the second audio storage area (Sa1) 25, a unit H2 (recording start address Ah2 and number of bytes Nh2) and unit H3 (recording start address Ah3 and number of bytes Nh3) in the second header storage area (Sh1) 26.

As shown in FIG. 9, two instruction sets IST #0 and #1 are generated by the CPU 16.

The instruction set IST #0 has stated "6" in the "No. of instructions" column 38 and the first multiplexed stream MS0 in the "Output target" column 39. That is, in the instruction set IST #0, there is stated multiplexed instruction data 33 for identifying units H0, A0, V0, H1, A1 and V1 in this order. The instruction set IST #1 has stated "6" in the "No. of instructions" column 38 and the second multiplexed stream MS1 in the "Output target" column 39. That is, in the instruction set IST #1, there is stated multiplexed instruction data 33 for identifying units H2, A2, V2, H3, A3 and V3 in this order.

By executing the above instruction sets, two multiplexed streams MS0 and MS1 as shown in FIG. 10 are provided.

(Multiplexer)

The multiplexer 17 which executes controlling operations states in the above instruction sets is constructed as will be described below in detail with reference to FIG. 11.

Figure 11:
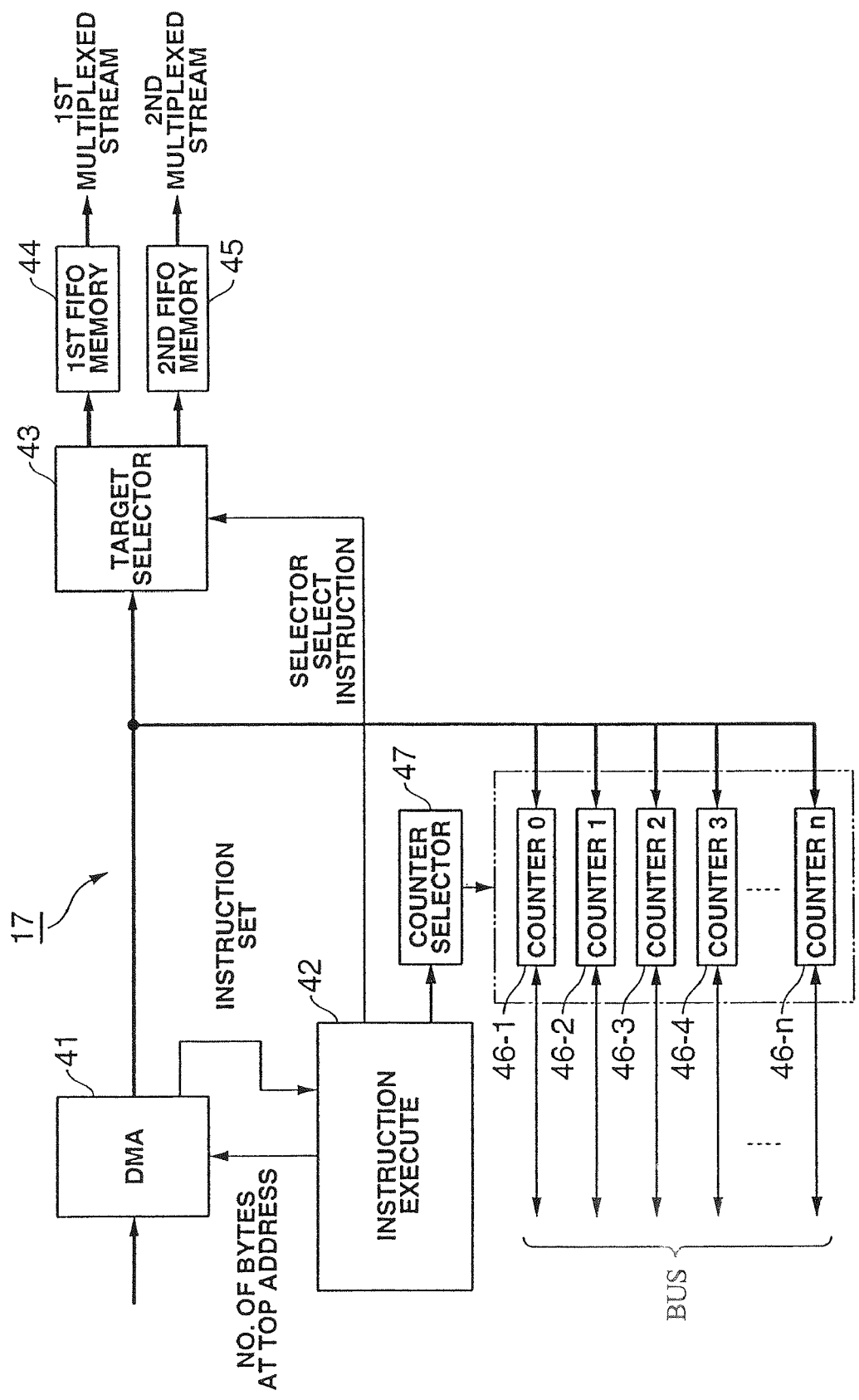
FIG. 11 is a block diagram of a multiplexer included in the first embodiment of the multiplexing system.

As shown in FIG. 11, the multiplexer 17 includes a direct memory access (DMA) circuit 41, instruction execute circuit 42, target selector 43, first FIFO memory 44, second FIFO memory 45, first to n-th counters 46-1 to 46-$n$ ($n$ is a natural number), and a counter selector 47.

The DMA circuit 41 is provided to read data by accessing directly the data memory 19 and instruction memory 18, not via the CPU 16. Supplied with a start address and number of bytes from the instruction execute circuit 42, the DMA circuit 41 reads the designated number of bytes of data successively from the designated start address. When the read data is an elementary stream (video stream VES0 or VES1, audio data AES0 or AES1, or header data HS0 or HS1), the DMA circuit 41 supplies the data to the target selector 43. On the other hand, when the read data is an instruction set, the DMA circuit 41 supplies the data to the instruction execute circuit 42.

The instruction execute circuit 42 controls the DMA circuit 41, target selector 43 and counter selector 47 according to the instruction set. The execution control by the instruction execute circuit 42 will be described in detail later.

The target select 43 is supplied with data stream from the DMA circuit 41 and selectively supplies the supplied data stream to either the first FIFO memory 44 or second FIFO memory 45. Selection of either of the first and second FIFO memories 44 and 45 is controlled by the instruction execute circuit 42.

The "FIFO" stands for "first in, first out". Namely, the first and second FIFO memories 44 ad 45 take a predetermined number of bits as one word and transfer data in units of a word in shift. A data stream output from the first FIFO memory 44 is supplied as the first multiplexed stream MS0 to outside, and a data stream output from the second FIFO memory 45 is supplied as the second multiplexed stream MS1 to outside.

Each of the first to n-th counters 46-1 to 46-$n$ subtracts an amount of data transferred from the DMA circuit 41 to the target selector 43 from a count held therein. Further, the CPU 16 and each of the encoders 12 to 15 can make reference to and update the first to n-th counters 46-1 to 46-$n$ via the data bus 11. It should be noted that the operation of each of the first to n-th counters 46-1 to 46-$n$ will be described in detail later.

The counter selector 47 selects, and puts into operation, any one of the first to n-th counters 46-1 to 46-$n$. A selected counter is controlled correspondingly to the area information 37 in the multiplexing instruction data. Therefore, the counter selected by the counter selector 47 subtracts a number of bits transferred from the DMA circuit 41 to the target selector 43 from a count held therein while each of the other counters, not selected, holds a count therein as it is.

Figure 12:
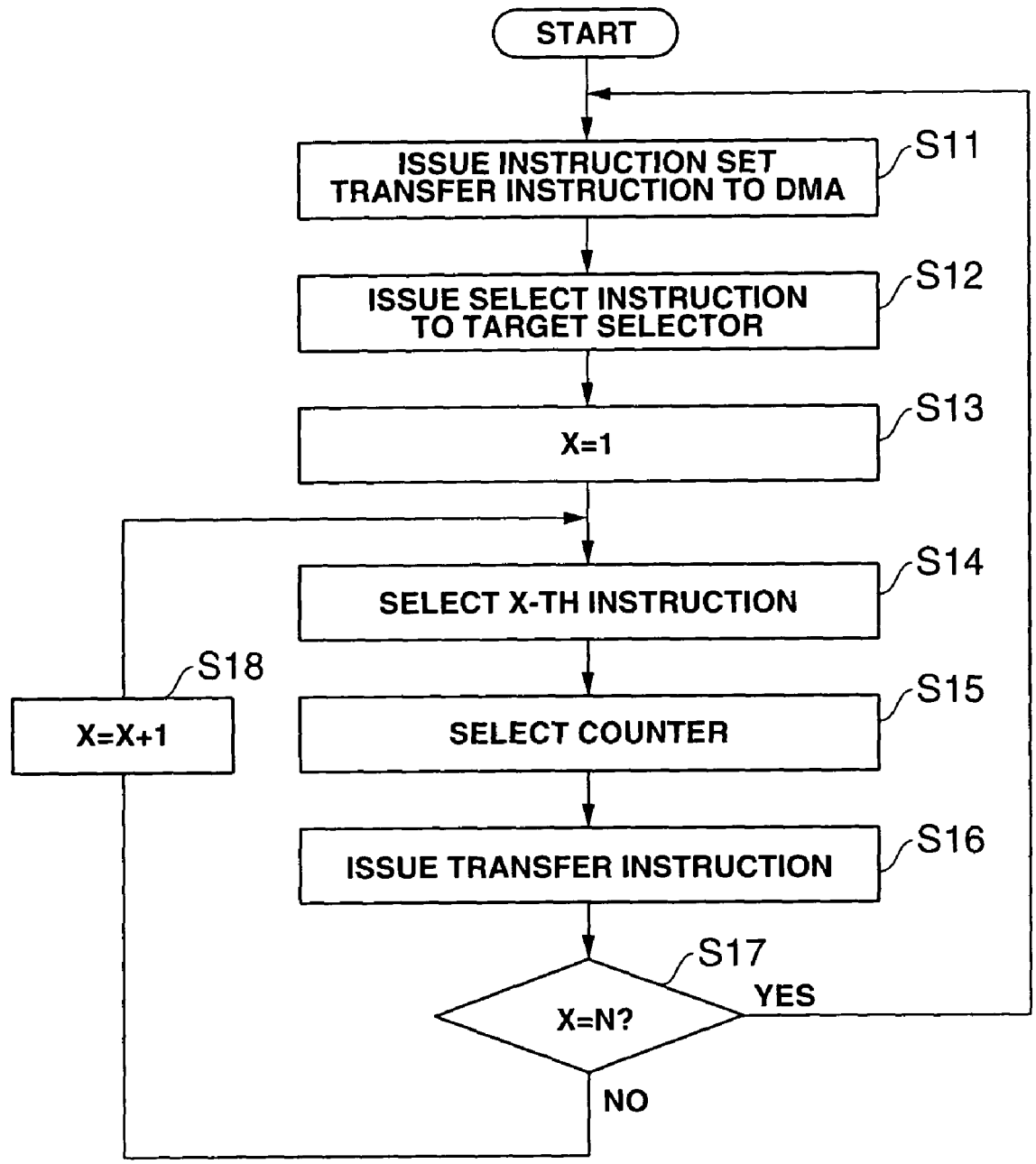
FIG. 12 shows a flow of operations made in an instruction execution circuit included in the multiplexer in FIG. 11.

Next, how an instruction set is executed by the instruction execute circuit 42 will be described with reference to the flow chart shown in FIG. 12.

First in step S11, the instruction execute circuit 42 issues a transfer instruction for reading an instruction set from the instruction memory 18 to the DMA circuit 41. At this time, the instruction execute circuit 42 also supplies the DMA circuit 41 with a recording start address for the instruction set to be read and a number of bytes of the instruction set. Upon reception of the instruction issued in step S11, the DMA circuit 41 will read data for the designated number of bytes of data from the designated address in the instruction memory 18. The data read by the DMA circuit 41 is supplied to the instruction execute circuit 42 since it is a data row of the instruction set.

Then in step S12, the instruction execute circuit 42 makes reference to the "Output target" column 39 in the table information 32 in the supplied instruction set and issues a select instruction to the target selector 43. That is, when the "Output target" column 39 has stated therein a value which identifies the first multiplexed stream MS0, the instruction execute circuit 42 issues an instruction for selection of the first FIFO memory 44. On the other hand, when the "Output target" column 39 has stated therein a value which identifies the second multiplexed stream MS1, the instruction execute circuit 42 will issue an instruction for selection of the second FIFO memory 45. Upon reception of the select instruction issued in step S12, the target selector 43 switches an output port thereof for output of an input data stream to either the first FIFO memory 44 or second FIFO memory 45 depending upon the content of the select instruction.

Next in step S13, the instruction execute circuit 42 initializes the value of a variable X to "1". It should be noted that the variable X indicates the order of an instruction being processed.

Then in step S14, the instruction execute circuit 42 selects an X-th multiplexing instruction data in the instruction set having been read in step S11. That is, since the instruction set has stated therein a plurality of multiplexing instruction data as a list, the instruction execute circuit 42 selects the X-th multiplexing instruction data counted from the top of the instruction set.

Next in step S15, the instruction execute circuit 42 issues, to the counter selector 47, an instruction for selection of one, corresponding to the area information 37 stated in the X-th multiplexing instruction data, from among the plurality of counters 46-1 to 46-n. When this instruction is issued, the counter selector 47 will enable the selected counter. It should be noted that the operations of the counters 46-1 to 46-n will be described in detail later.

Then in step S16, the instruction execute circuit 42 issues, to the DMA circuit 41, a transfer instruction for reading a unit from the data memory 19. At this time, the instruction execute circuit 42 will also supply the DMA circuit 41 with a recording start address 35 for the unit stated in the X-th multiplexing instruction data and a number of bytes 36 of the unit. Upon reception of the instruction issued in step S16, the DMA circuit 41 will read the designated number of bytes of data from the designated address in the data memory 19. The data read by the DMA circuit 41 is supplied to the target selector 43 since it is an elementary stream (video, audio or header) to be multiplexed. The data stream transferred to the target selector 43 is transferred to either the first FIFO memory 44 or second FIFO memory 45, selected by the target selector 43, which will output a multiplexed stream.

Next in step S17, the instruction execute circuit 42 judges whether X=N (N is a value stated in the "No. of instructions" column 38. More specifically, the instruction execute circuit 42 judges in step S17 whether all the multiplexing instruction data in one instruction set have completely been processed. When the judgement is affirmative, the instruction execute circuit 42 return to step S11 where it will repeat the above procedure from the beginning. That is, the instruction execute circuit 42 will restart the procedure with reading of a next instruction set recorded in the instruction memory 18. When the judgment made in step S17 is negative, namely, when all the multiplexing instruction data have not completely been processed, the instruction execute circuit 42 will return to step S14 with incrementing the variable X by one (in step S18). Namely, the instruction execute circuit 42 will set up a procedure for selection of a next multiplexing instruction data.

Going through steps S11 to S18 as above, the instruction execute circuit 42 execute the multiplexing instruction data stated in the instruction set sequentially one by one. So, it can read the elementary streams recorded in the data memory 19 sequentially unit by unit and generate a multiplexed stream.

Also, since the instruction execute circuit 42 switches the target selector 43 correspondingly to the content of statement in the "Output target" column 39 in the instruction set in step S12, it can output a plurality of multiplexed streams by a single execute-circuit configuration.

(Counters)

The counters 46-1 to 46-n operate as will be described below:

The multiplexer 17 includes the plurality of counters 46-1 to 46-n as above. Each of the counters 46-1 to 46-n has a one-to-one correspondence to each divisional area in the data memory 19. For example, the first counter 46-1 corresponds to the first video storage area 21, second counter 46-2 corresponds to the first audio storage area 22, third counter 46-3 corresponds to the first header storage area 23, fourth counter 46-4 corresponds to the second video storage area 24, fifth counter 46-5 corresponds to the second audio storage area 25, and the sixth counter 46-6 corresponds to the second header storage area 26.

Also, only one of the counters 46-1 to 46-n is selected by the counter selector 47. In a selected counter 46, an amount of data (e.g., number of bytes) transferred from the DMA circuit 41 to the target selector 43 is subtracted from a count held in the counter 46. It should be noted that the selected counter 46 is controlled according to the stated content of the area information 37 in a multiplexing instruction data. Namely, since the area information 37 has stated therein a divisional area in the data memory 19 where a unit being transferred is recorded, the counter selector 47 will select a counter corresponding to the divisional area and the unit is subtracted from the count in the counter.

Thus, the count in each of the counters 46-1 to 46-n indicates an amount of data in a corresponding divisional area.

Also, the CPU 16 and each of the encoders 12 to 15 can make reference to and update the counts in the counters 46-1 to 46-n via the data bus 11.

A certain one of the counters (first counter 46-1) operates as will be described below with reference to FIGS. 13 and 14.

Figure 13:
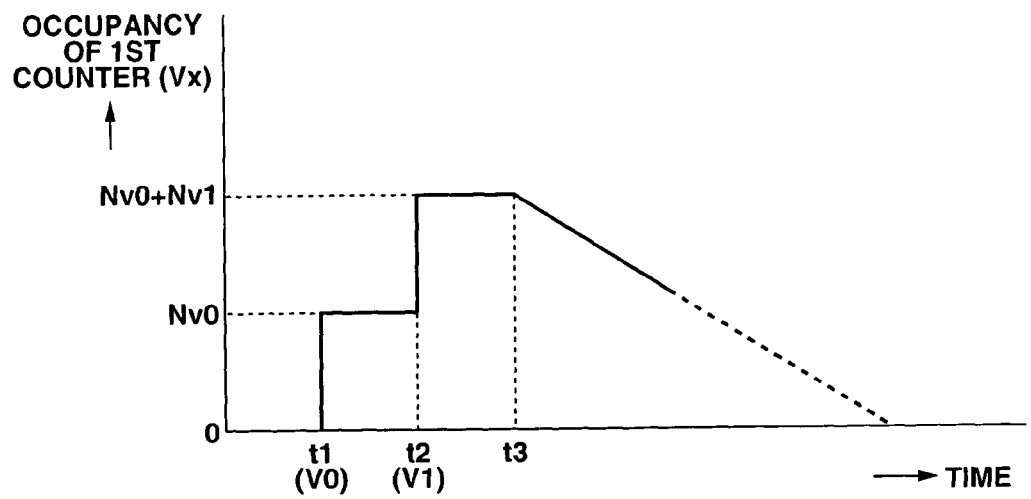
FIG. 13 shows a variation of a value counted by a counter included in the multiplexer.

First as shown in FIG. 13, it is assumed that a unit V0 of Nv0 (bytes) is recorded in the first video storage area 21 at a time t1. At this time, the CPU 16 adds a value "Nv0" to a count Vx in the first counter 46-1 (on the assumption that the initial value of the count Vx is zero). It should be noted that the CPU 16 can know, from acknowledgment of a storage location information sent from each of the encoders 12 to 15, that the unit V0 is recorded in the first video storage area 21. Also, at this time, the CPU 16 generates a multiplexing instruction data for the unit V0 and stores it into the instruction memory 18.

Next, it is assumed a unit V1 of Nv1 (bytes) is recorded in the first video storage area 21 at a time t2. The CPU 16 adds a value "Nv1" to the current count Vx=Nv0. It should be noted that at this time, the CPU 16 will generate a multiplexing instruction data for the unit V1 and store it into the instruction memory 18.

Figure 14:
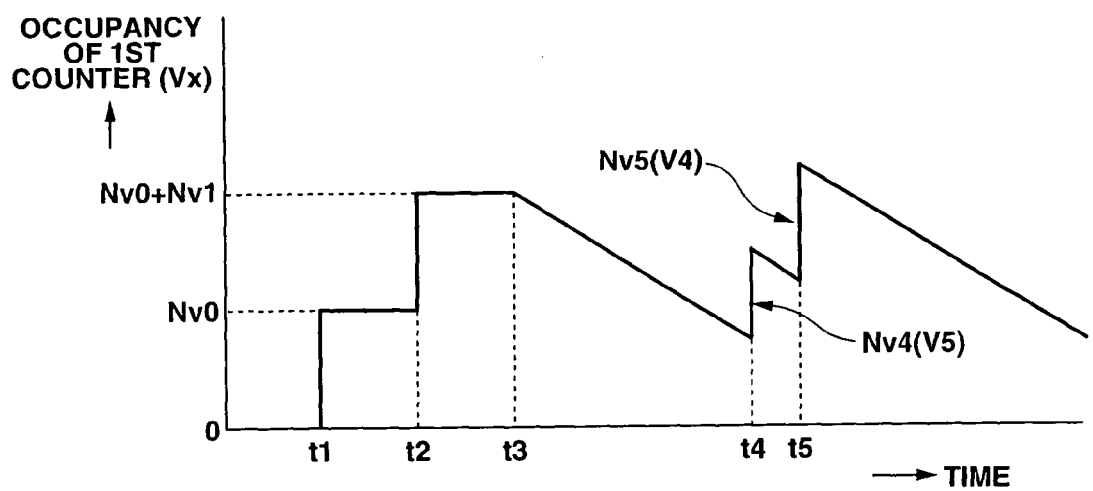
FIG. 14 shows a variation of a counter-counted value continued from the variation shown in FIG. 13.

Next, at a time t3, the multiplexer 17 starts execution of the multiplexing instruction for the units V0 and V1, and the units V0 and V1 are read from the data memory 19, as shown in FIG. 14. When the units V0 and V1 start being read, the count Vx in the first counter 46-1 starts decreasing correspondingly to the amount of transferred data.

Next, when units V4 and V5 are recorded in the first video storage area 21 at times t4 and t5, respectively, while the units V0 and V1 are being read (at the times t4 and t5), the data mount of the units V4 and V5 are added to the count Vx in the first counter 46-1.

As above, when units are recorded, the counts held in the counters 46-1 to 46-n increase correspondingly by the recorded data amount of the units. When units are read, the counts in the counters 46-1 to 46-n decrease correspondingly by the read data amount of the units. Therefore, each of the counts held in the counters 46-1 to 46-n indicates the bit occupancy of a corresponding area.

Further, since the counters 46-1 to 46-n correspond to areas in the data memory 19, a bit occupancy can be indicated for each of the areas.

As above, the multiplexing system 10 includes the counters 46-1 to 46-n which manage the bit occupancy of each area in the data memory 19 by hardware. Therefore, it is not necessary for the CPU 16 to calculate and manage, by software, the bit occupancy in the data memory 19. So, the processing burden to the CPU 16 can be lessened.

Also, external reference can be made to the count in each of the counters 46-1 to 46-n via the data bus 11. Thus, when writing data to the data memory 19, each of the encoders 12 to 15 can quickly judge whether it is possible to make the data write by referring to the counter in a counter 46 corresponding to an area to which the data is to be written.

Second Embodiment

Next, there will be described the second embodiment of the multiplexing system according to the present invention. The multiplexing system is generally indicated with a reference 50.

Similarly to the multiplexing system 10 as the first embodiment of the present invention, the multiplexing system 50 as the second embodiment of the present invention also multiplexes video and audio data to generate two multiplexed streams MS0 and MS1 for distribution over a network, and outputs these multiplexed streams simultaneously. The same or similar elements in the multiplexing system 50 as or to those in the multiplexing system 10 are indicated with the same or similar references as those used in the description and illustration of the multiplexing system 10 and will not be described any longer.

Figure 15:
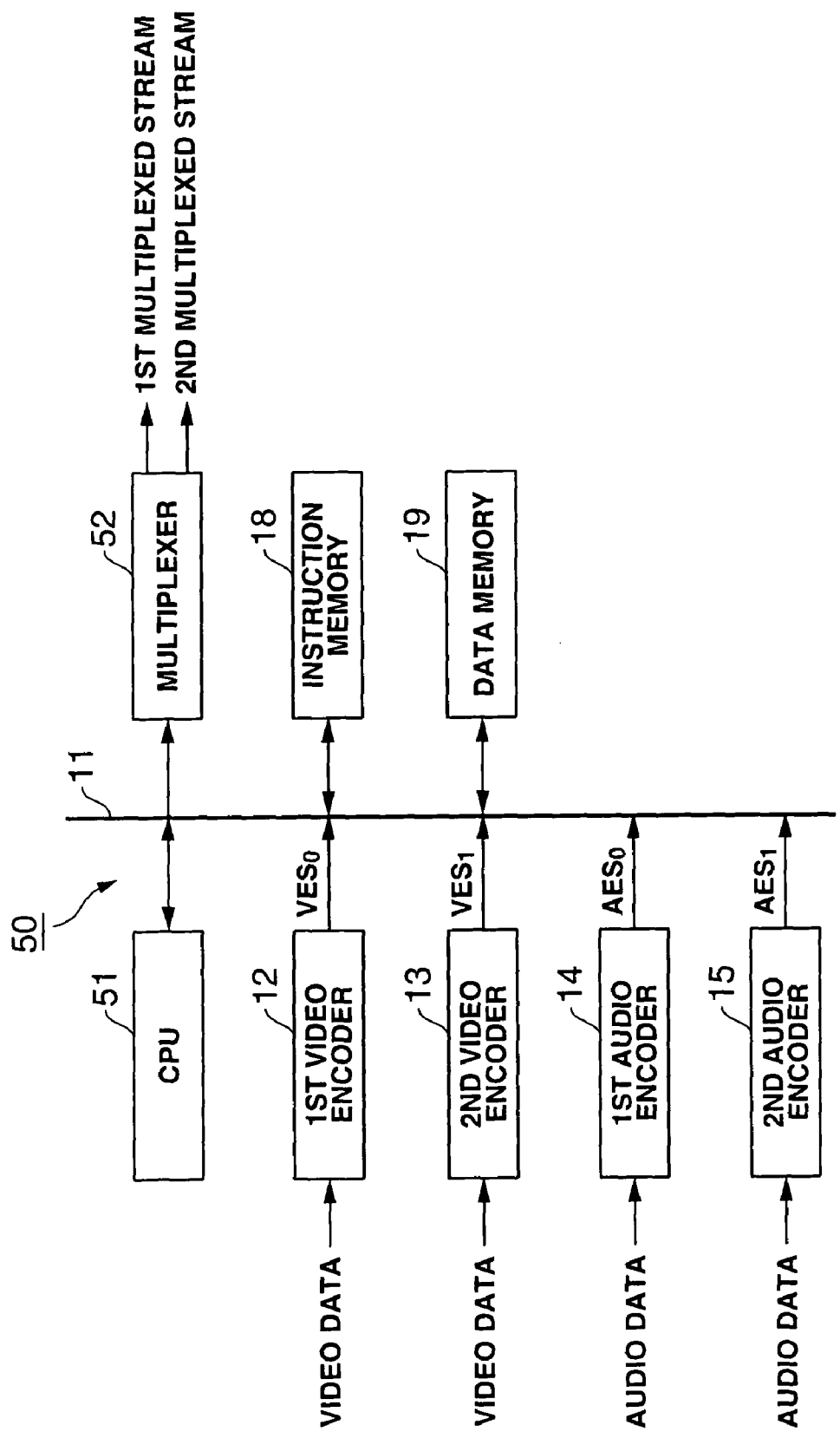
FIG. 15 is a block diagram of the first embodiment of the multiplexing system according to the present invention.

As shown in FIG. 15, the multiplexing system 50 includes a data bus 11, and also first and second video encoders 12 and 13, first and second audio encoders 14 and 15, CPU 51, multiplexer 52, instruction memory 18 and a data memory 19, all connected to the data bus 11.

The CPU 51 controls the multiplexing system 50 as a whole. Similarly to the CPU 16 in the first embodiment, the CPU 51 generates header data HS0 and HS1, divides each of the header data into units, and stores the units into the data memory 19 via the data bus 11. Also, similarly to the CPU 16 in the first embodiment, the CPU 51 adds a predetermined value to a counter in the multiplexer 52.

Also, in the encoding operations, the CPU 51 will calculate an order of multiplexing the units on the basis of the storage location information and system information supplied from the encoders 12 to 15, generates the instruction set in which the unit storage location, order of multiplexing the units, etc. are stated, and stores the generated instruction set into the instruction memory 18, similarly to the first embodiment.

However, the CPU 51 is different from the CPU 16 in the first embodiment in that it generates an instruction set including command instruction data.

(Instruction Set)

The command instruction data has stated therein an instruction causing the multiplexer 52 to make some data processing in an arbitrary position in a data row when outputting multiplexed streams.

Figure 16:
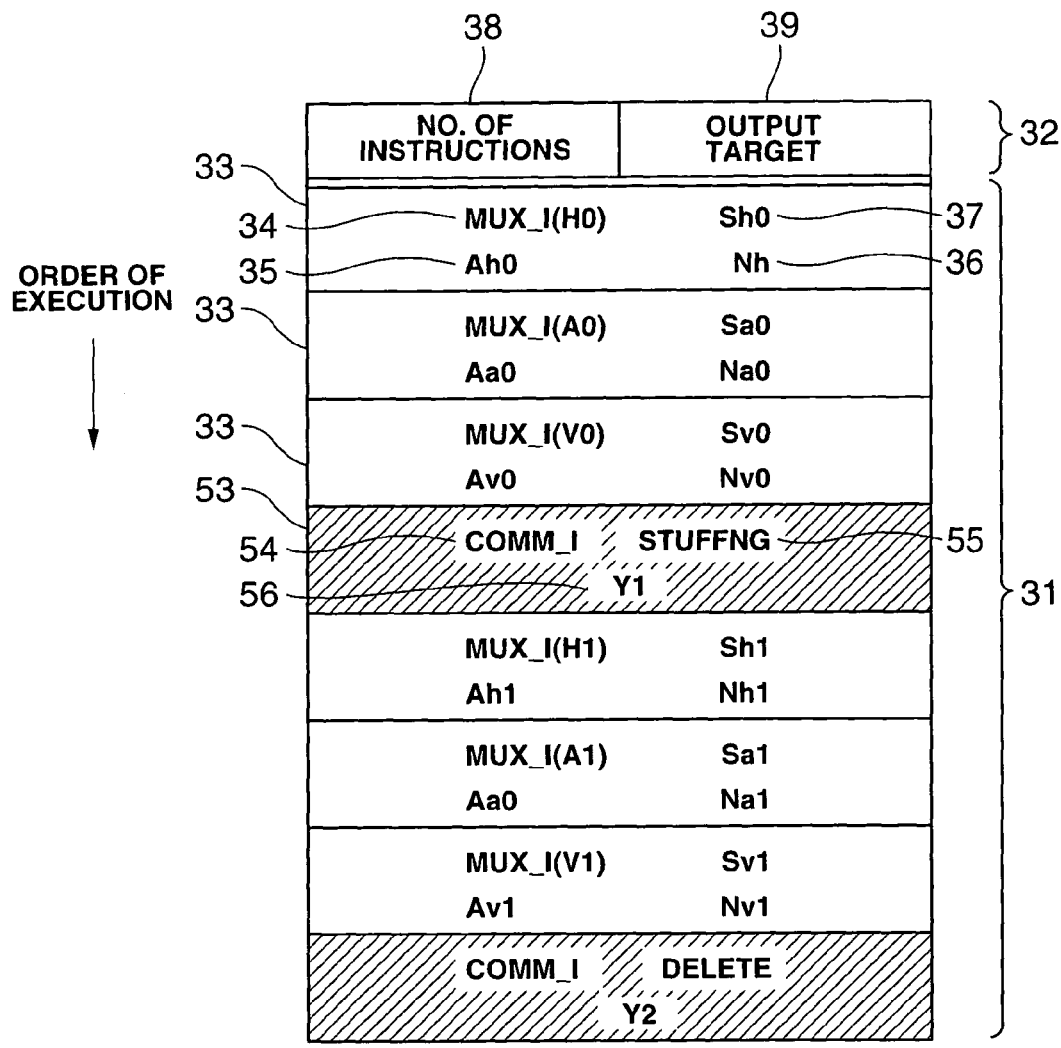
FIG. 16 shows instruction sets used in a second embodiment of the multiplexing system according to the present invention.

FIG. 16 shows an instruction set including command instruction data 53.

The command instruction data 53 is stated along with multiplexing instruction data in an instruction group 31. The multiplexer 52 executes the multiplexing instruction data 33 in its stated order. When the command instruction data 53 occurs in the course of the execution, the multiplexer 52 will make a data processing stated in the command instruction data 53 without data transfer from a DMA circuit 41.

The command instruction data 53 has stated therein ID information 54 indicating that the data is command instruction data, content of data processing 55 and necessary data 56 for execution of a data processing.

The data processing executed according to the command instruction data 53 includes, for example, insertion of dummy data called stuffing data or padding data to an arbitrary position in a multiplexed stream (stuffing), deletion of data in an arbitrary position in the multiplexed stream just before outputting (data deletion), insertion of arbitrary data such as concurrent output time information to an arbitrary position in the multiplexed stream (data insertion) and sending of output timing in an arbitrary position in the multiplexed stream to CPU and output (acknowledging).

By stating the multiplexing instruction data 33 and command instruction data 53 in an instruction set on the basis of a multiplexed position of a unit and order of executing the data processing, it is possible to cause the multiplexer 52 to make a desired data processing in an arbitrary position in a data row to be multiplexed, such as data processing between arbitrary units, for example.

Note that when the command instruction data 53 is added as above, a total number of multiplexing instruction data 33 and command instruction data 53 stated in the instruction set is stated in a "No. of instructions" column 38.

(Multiplexer)

The multiplexer 52 which executes an instruction set including the above command instruction data 53 is constructed as will be described in detail below:

The multiplexer 52 generates a first multiplexed stream MS0 by multiplexing video stream VES0, audio stream AES0 and header data HS0, and a second multiplexed stream MS1 by multiplexing video stream VES1, audio stream AES1 and header data HS1. The multiplexer 52 generates the first and second multiplexed streams MS0 and MS1 simultaneously and supplies them to outside simultaneously similarly to the multiplexer 52 in the first embodiment except that it is constructed to execute an instruction set including the command instruction data.

Figure 17:
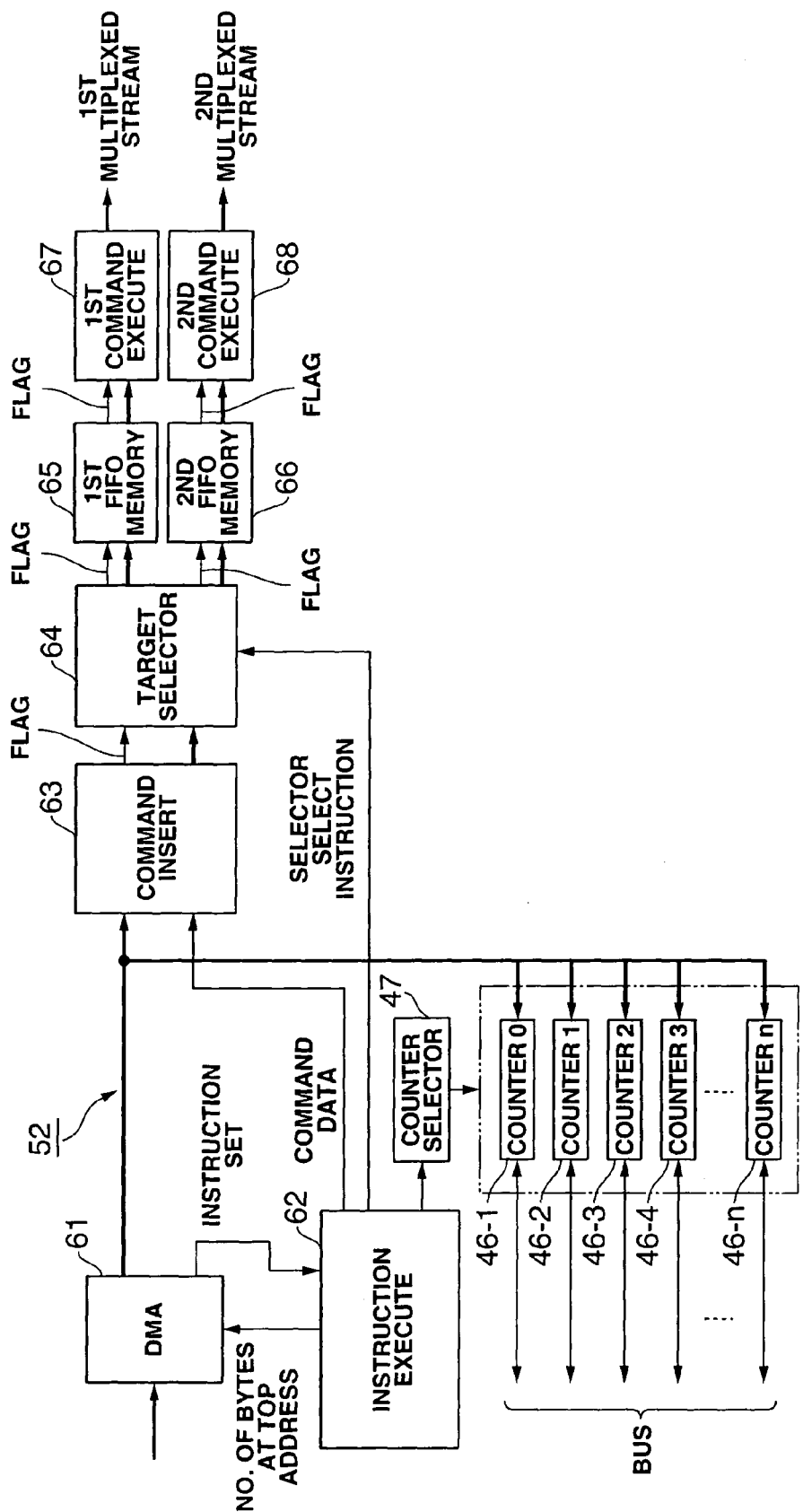
FIG. 17 is a block diagram of a multiplexer included in the second embodiment of the multiplexing system.

The multiplexer 52 is internally constructed as will be described in detail below:

As shown in FIG. 17, the multiplexer 52 includes a DMA circuit 61, instruction execute circuit 62, command insert circuit 63, target selector 64, first and second FIFO memories 65 and 66, first and second command execute circuits 67 and 68, first to n-th counters 46-1 to 46-n (n is a natural number), and a counter selector 47.

The DMA circuit 61 reads data by accessing directly the data memory 19 and instruction memory 18, not via the CPU 51. The DMA circuit 61 is supplied with a designated start address and number of bytes from the instruction execute circuit 62 and reads the designated number of bytes of data successively from the designated address. When the read data is an elementary stream (video stream VES0 or VES1, audio stream AES0 or AES1, or header data HS0 or HS1), the DMA circuit 61 supplies the data to the command insert circuit 63. On the other hand, when the read data is an instruction set, the DMA circuit 61 supplies the data to the instruction execute circuit 62.

The instruction execute circuit 62 supplies a data transfer control instruction to the DMA circuit 61, a command insert instruction to the command insert circuit 63, a select instruction to the target selector 64, and a count select instruction to the counter selector 47 on the basis of the instruction set. The execution control operation of the instruction execute circuit 62 will be described in detail later.

Supplied with elementary data from the DMA circuit 61, the command insert circuit 63 transfers the data as it is to the target selector 64. When supplied with a command insert instruction from the instruction execute circuit 62, the command insert circuit 63 will generate command data having stated therein the content of a data processing, and transfers the generated command data to the target selector 64.

Figure 18:
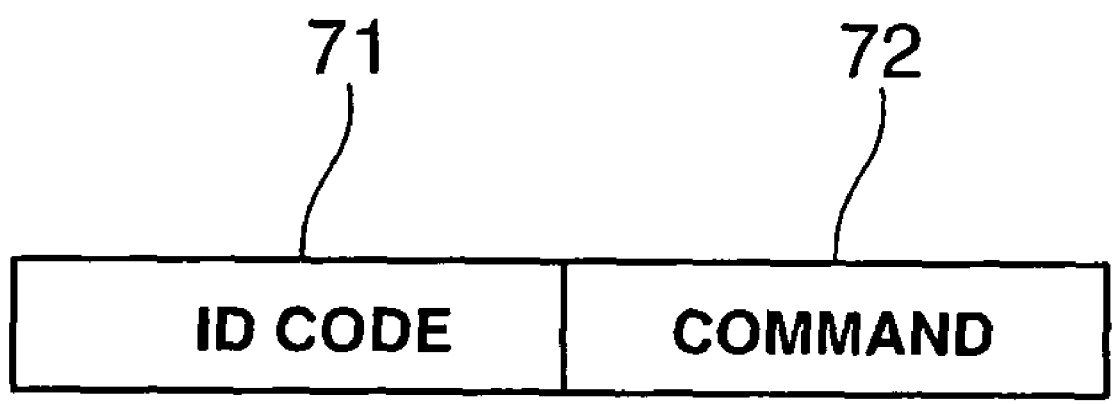
FIG. 18 shows command data generated by a command insertion circuit included in the multiplexer shown in FIG. 17.

The command data generated by the command insert circuit 63 is composed of an ID code 71 and command code 72 as shown in FIG. 18. The ID code 71 is to identify next data as the command data 72. The ID code 71 has a fixed data pattern for all command data. The command data 72 has an ID for identification of the content of data processing and parameters used in the data processing. The amount of the command data is constant irrespectively of the ID and content and number of parameters stated in the command code 72.

When supplied with a command insert instruction from the instruction execute circuit 62, the command insert circuit 63 generates the above command data according to the content of data processing supplied along with the command insert instruction. Then, the command insert circuit 63 transfers the generated command data to the target selector 64.

The target selector 64 is supplied with a data stream from the DMA circuit 61 and selectively outputs the input data stream to either the first or second FIFO memory 65 or 66, selected by the instruction execute circuit 62.

As well known, the "FIFO" stands for "first in, first out". Namely, the first and second FIFO memories 65 ad 66 take a predetermined number of bits as one word and transfer data in units of a word in shift. A data stream output from the first FIFO memory 44 is supplied as the first multiplexed stream MS0 to outside, and a data stream output from the second FIFO memory 45 is supplied as the second multiplexed stream to outside. The data stream output from the first FIFO memory 65 is supplied to the first command execute circuit 67, while the data stream output from the second FIFO memory 66 is supplied to the second command execute circuit 68.

Note that each of the bus width (word width) of a data path from the command insert circuit 63 to the first command execute circuit 67, bus width (word width) of a data path from the command insert circuit 63 to the second command execute circuit 68. And the bit width (word width) of the first and second FIFO memories 65 and 66, has a flat bit line added thereto and thus is increased one bit of bus width.

Figure 19:
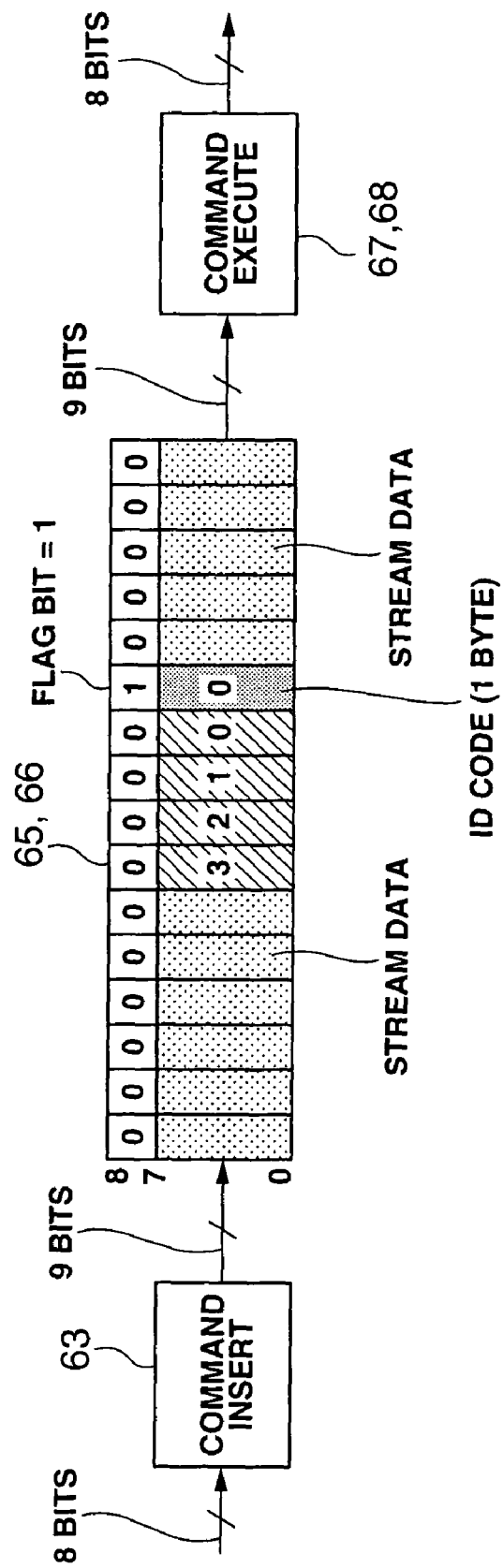
FIG. 19 explains a data transfer bus from the command insertion circuit to a command execution circuit, having the width thereof increased from 8 to 9 bits.
Figure 20:
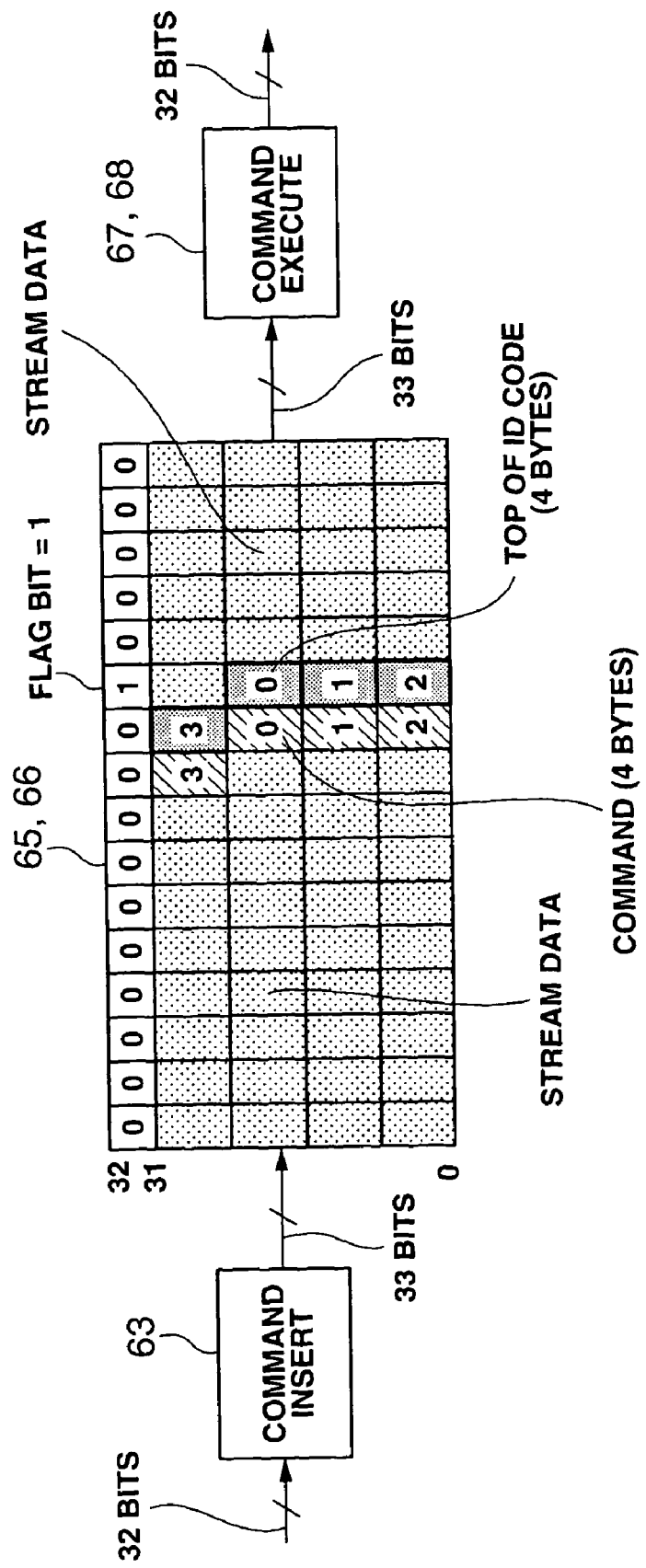
FIG. 20 explains the data transfer but from the command insert circuit to the command execution circuit, having the width thereof increased from 32 to 33 bits.

For example, in case the multiplexing system 50 is to transfer data in an 8-bit width, the bus width is increased to 9 bits to form a flag bit transfer line as shown in FIG. 19. In this case, a flag bit generated by the command insert circuit 63 is transferred along a transfer line of the flag bit while data included in the multiplexed stream are transferred along a transfer line of the remaining 8 bits. Also, in case the multiplexing system 50 is to transfer data in 32-bit width, the bus width is increased to 33 bits to form a flag bit transfer line as shown in FIG. 20. In this case, a flag bit generated by the command insert circuit 63 is transferred along a transfer line of the fag bit, while data included in the multiplexed stream is transferred along a transfer line of the remaining 32 bits.

The flag bit is used to identify the position of a top bit in command data. The command insert circuit 63 sets the flag bit to High (e.g., "1") when sending the top bit in an ID code for the command data. When sending any other data, the command insert circuit 63 sets the flag bit to Low (e.g., "0").

The first command execute circuit 67 is supplied with a multiplexed stream transferred from the first FIFO memory 65, while the second command execute circuit 68 is supplied with a multiplexed stream transferred from the second FIFO memory 66. Each of the first and second command execute circuits 67 and 68 judges whether data row in the transferred multiplexed stream is command data. The judgment is done as follows. First, a flag bit being an extension bit of the bus is detected. When the flag is High (e.g., "1"), a word whose flag is High is read, and a data pattern of an ID code in the data row is retrieved. When the data pattern of the ID code is retrieved, the data following the ID code should be a command code. Each of the first and second command execute circuits 67 and 68 reads an ID and parameter stated in the command code, and makes a data processing corresponding to the ID and parameter.

When the data row in the supplied multiplexed stream is not any command data, that is, when the data row is an ordinary elementary stream (video, audio or header stream), each of the first and second command execute circuits 67 and 68 will supply the data as it is to outside. It should be noted that when command data is included in the multiplexed stream, the command execute circuit will remove the data row (ID code and command) in the command data, not supplying the data to outside. The data stream output from the first command execute circuit 67 is supplied as the first multiplexed stream MS0 to outside, while data stream output from the second command execute circuit 68 is supplied as the second multiplexed stream MS1 to outside.

Figure 21:
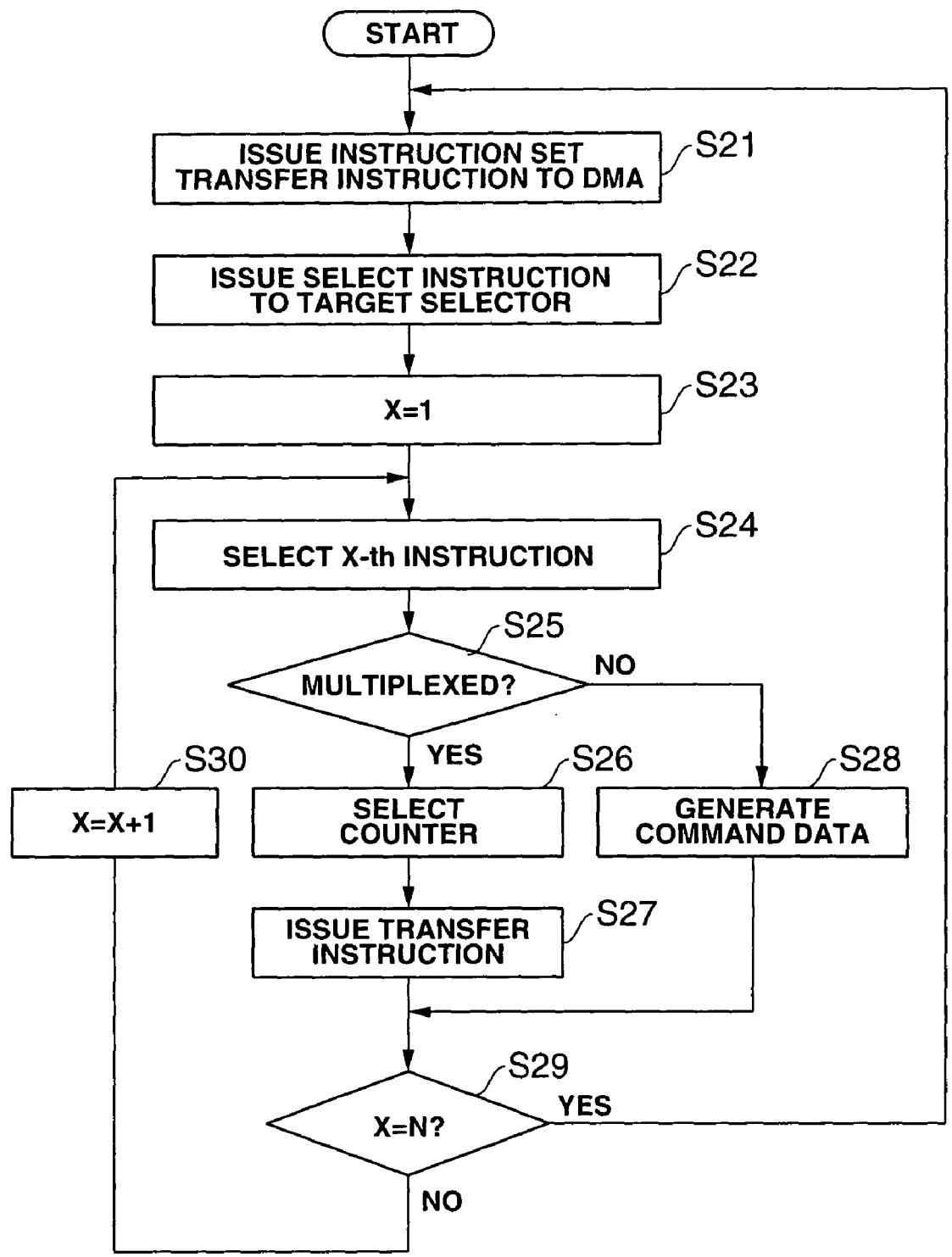
FIG. 21 shows a flow of operations made in the instruction execution circuit in the multiplexer included in the second embodiment of the multiplexing system.

Next, the processing of an instruction set by the instruction execute circuit 62 will be described with reference to the flow chart in FIG. 21.

First in step S21, the instruction execute circuit 62 issues a transfer instruction for reading the instruction set from the instruction memory 18 along with a recording start address and number of bytes to the DMA circuit 61. Upon reception of the instruction issued in step S21, the DMA circuit 61 will reads the designated number of bytes of data from the designated address in the instruction memory 18. The data thus read by the DMA circuit 61 is supplied from the DMA circuit 61 to the instruction execute circuit 62 because it is a data row in the instruction set.

Next in step S22, the instruction execute circuit 62 makes reference to the "Output target" column 39 in the table information 32 in the transferred instruction set and issues a select instruction to the target selector 64. Upon reception of the select instruction issued in step S22, the target selector 64 will switch the output port thereof for supplying the input data stream to either the first or second FIFO memory 65 or 66 depending upon the content of the select instruction.

Then in step S23, the instruction execute circuit 62 initializes the value of a variable X to "1". The variable X indicates an order of the instruction being processed.

Next in step S24, the instruction execute circuit 62 selects an X-th instruction data in the instruction set read in step S21.

Then in step S25, the instruction execute circuit 62 judges which the X-th instruction data is, multiplexing instruction data or command instruction data. When the judgment is such that the X-th instruction data is multiplexing instruction data, the instruction execute circuit 62 goes to step S26. On the other hand, if the instruction data is command instruction data, the instruction execute circuit 62 goes to step S28.

In step S26, the instruction execute circuit 62 issues, to the counter selector 47, a select instruction for selection of one of a plurality of counters 46-1 to 46-*n*, corresponding to area information 37 stated in the selected multiplexing instruction data. Next in step S27, the instruction execute circuit 62 issues, to the DMA circuit 61, a transfer instruction for reading a unit from the data memory 19 along with a recording start address 35 for the unit and a number of bytes 36 of the unit. Upon reception of the instruction issued in step S26, the DMA circuit 61 will reads the designated number of bytes of data from the designated address in the data memory 19. The data read by the DMA circuit 61 is passed as it is through the command insert circuit 63 and transferred to either the first or second FIFO memory 65 or 66 selected by the target selector 64. Through step S27, the instruction execute circuit 62 goes to step S29.

On the other hand, in step S28, the instruction execute circuit 62 issues, to the command insert circuit 63, a command insert instruction whose content corresponds to the selected command instruction data. Upon reception of the command insert instruction, the command insert circuit 63 generates command data and transfers the generated command data to the target selector 64. The command data is transferred to either the first or second FIFO memory 65 or 66, selected by the target selector 64. Through step S28, the instruction execute circuit 62 goes to step S29.

Next in step S29, the instruction execute circuit 62 judges whether X=N to determine whether all the multiplexing instruction data in one instruction set have been processed. When all such data have been processed, the instruction execute circuit 62 will return to step S21. On the contrary, if all the data have not yet been processed, the instruction execute circuit 62 returns to step S24 with incrementing the variable X by one in step S30.

With the operations made in steps S21 to S30, the instruction execute circuit 62 can multiplex elementary streams recorded in the data memory 19 unit by unit.

Next, the stuffing, deletion, acknowledging and data insertion made by the command execute circuits 67 and 68 will be explained.

Figure 22:
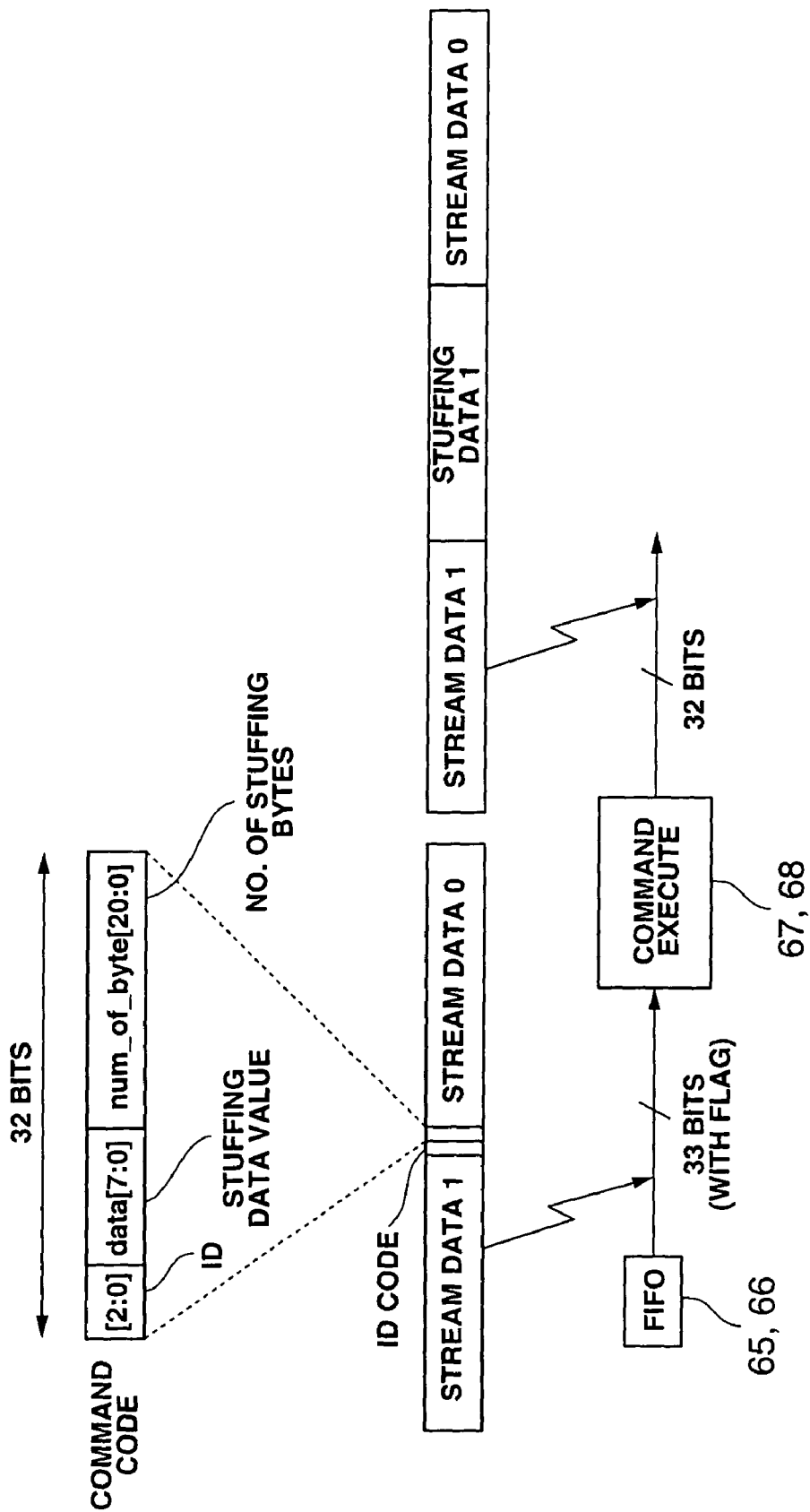
FIG. 22 explains an operation (stuffing) for inserting dummy data such as stuffing data or padding data to an arbitrary position in a multiplexed stream.

FIG. 22 explains how the stuffing is done.

For the stuffing operation, the command insert circuit 63 inserts command data into a multiplexed stream by inserting stuffing data according to a corresponding command instruction. In this case, the command code has stated therein a number indicating a stuffing operation as an ID, and parameters such as value of stuffing data and number of stuffing bytes.

When command data indicating the stuffing operation is detected, each of the command execute circuits 67 and 68 deletes input command data, and insert stuffing data to a position where the command data has been inserted. Then, it outputs the resulted data. For example, when command code has stated therein "0xff" as the value of stuffing data and "1000" as the number of stuffing bytes, each of the command execute circuits 67 and 68 generates 1000 bytes of "0xff" in the position where the command data has been inserted, and supplies the resulted data to outside.

As a result, the stuffing data can be inserted to an arbitrary position in the multiplexed stream.

Figure 23:
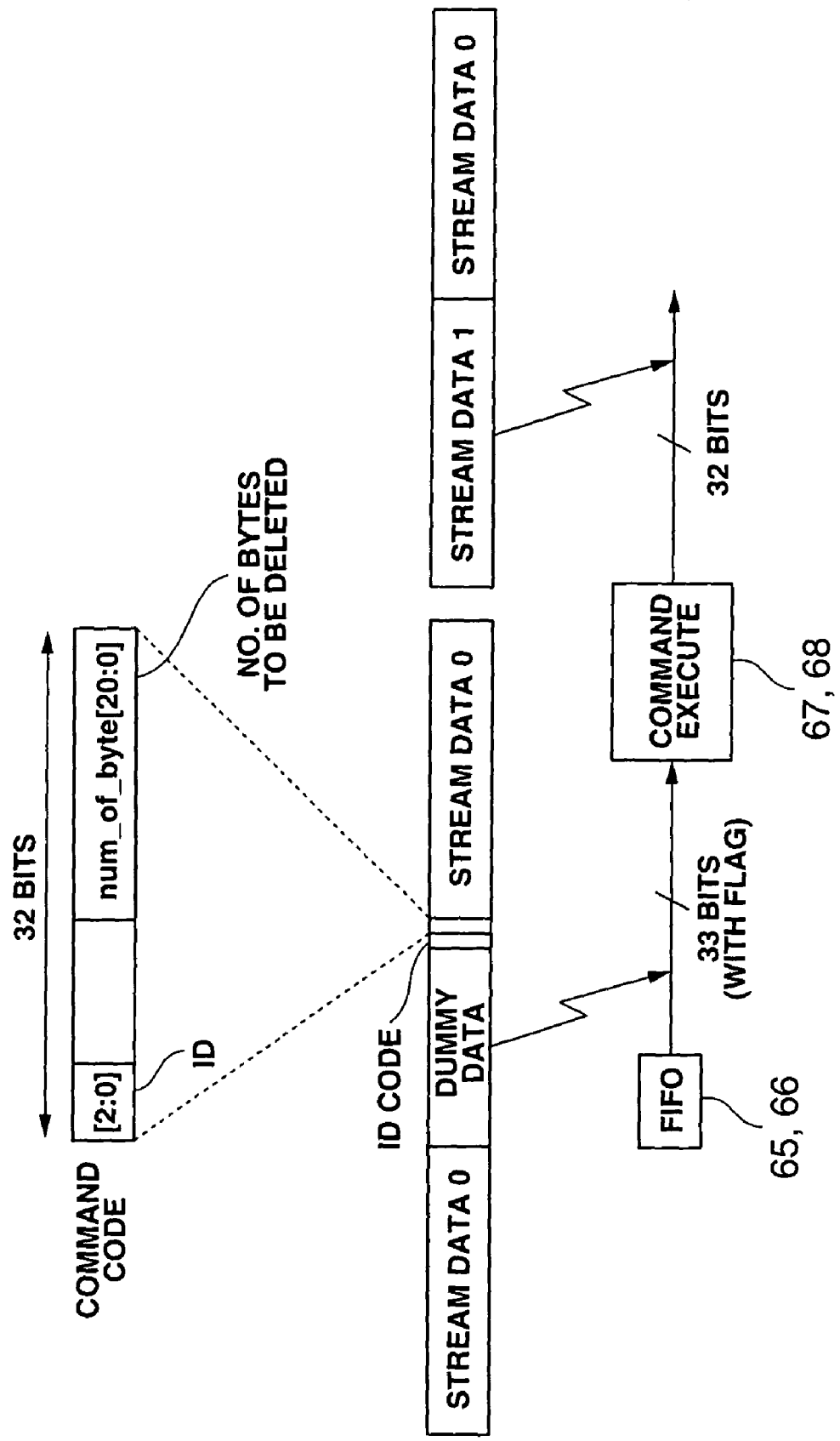
FIG. 23 explains an operation (data deletion) for deleting data in an arbitrary position in a multiplexed stream just before the data is outputted.

FIG. 23 explains how data is deleted.

For the deleting operation, the command insert circuit 63 inserts command data to just before object data in a multiplexed stream by executing a corresponding command instruction. In this case, the command code has stated therein a number indicating the deleting operation as an ID, and parameters such as a number of bytes to be deleted.

When a command data indicating the deleting operation is detected, each of the command execute circuits 67 and 68 deletes input command data, and delete a predetermined number of bytes of data from just after a position where the command data has been inserted. For example, if the command code has stated therein a number of bytes of data to be deleted as "64 bytes", each of the command execute circuits 67 and 68 deletes 64 bytes of data as stated.

When an arbitrary amount of data can be deleted just before outputting of a multiplexed stream, it is possible to force out data stored in the FIFO memories 65 and 66, for example. For example, in a multiplexing system in which a multiplexed stream has to be completely outputted from the FIFO memories 65 and 66 in a predetermined unit such as in units of an access unit, a packet or a pack, last data such as packets can be outputted from the FIFO memories 65 and 66 by inserting a delete command and dummy data to the last part of the predetermined unit. The last data can successfully be outputted without monitoring the data in the FIFO memories 65 and 66.

Figure 24:
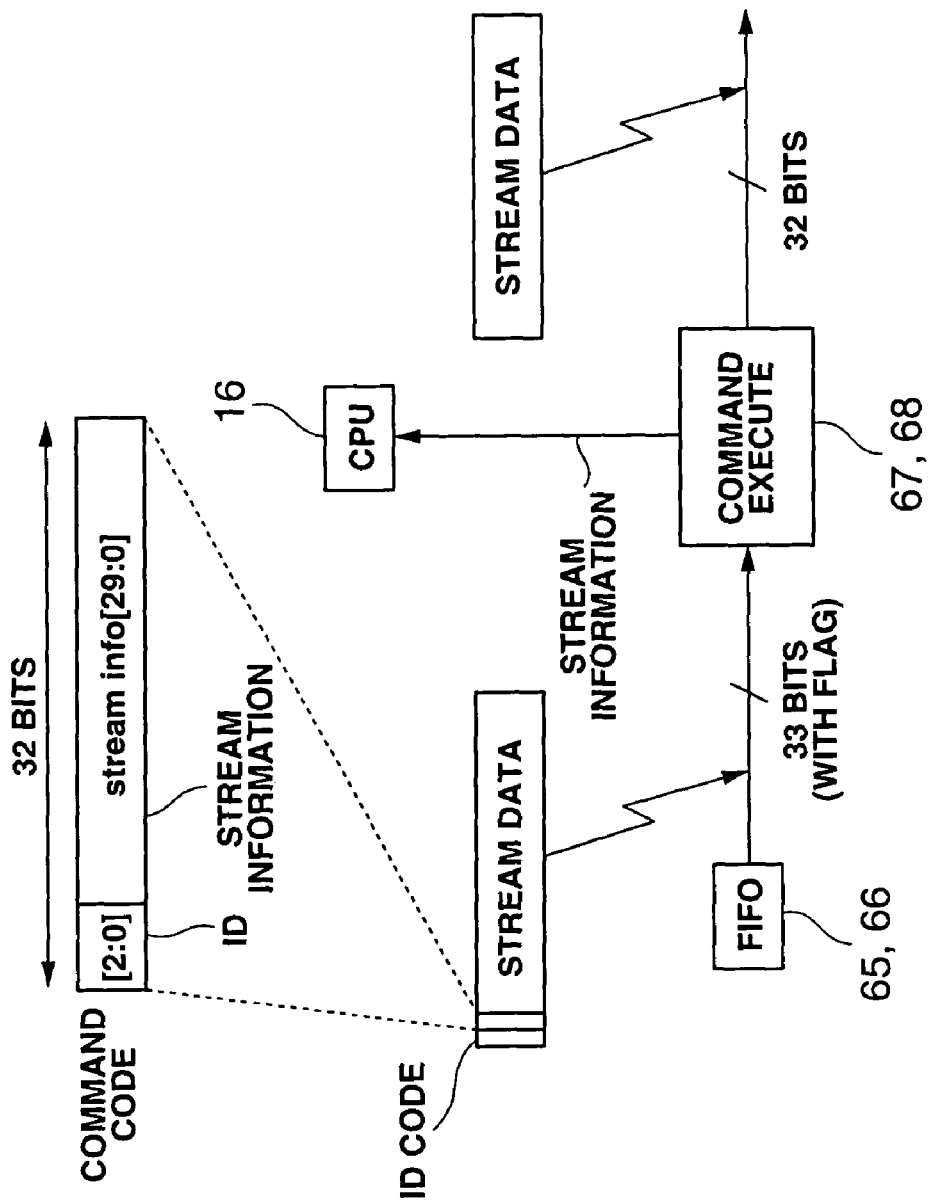
FIG. 24 explains an operation (notification) for sending a timing of supplying data in an arbitrary position in a multiplexed stream to CPU and outside.

FIG. 24 shows how the acknowledging is done.

For the acknowledging operation, the command insert circuit 63 inserts command data to a position where acknowledging is to be done in a multiplexed stream by executing a corresponding command instruction. In this case, the command code has stated therein a number indicating the acknowledging operation as an ID, and a parameter such as the content of information to be acknowledged (information on a stream being outputted, for example).

When command data indicating the acknowledging operation is detected, each of the command execute circuits 67 and 68 deletes input command data and sends information stated as a parameter in the command code to the CPU 51 and other circuits concerned.

As a result, it is possible for the CPU 51 etc. to know the current state of outputting of multiplexed streams.

Figure 25:
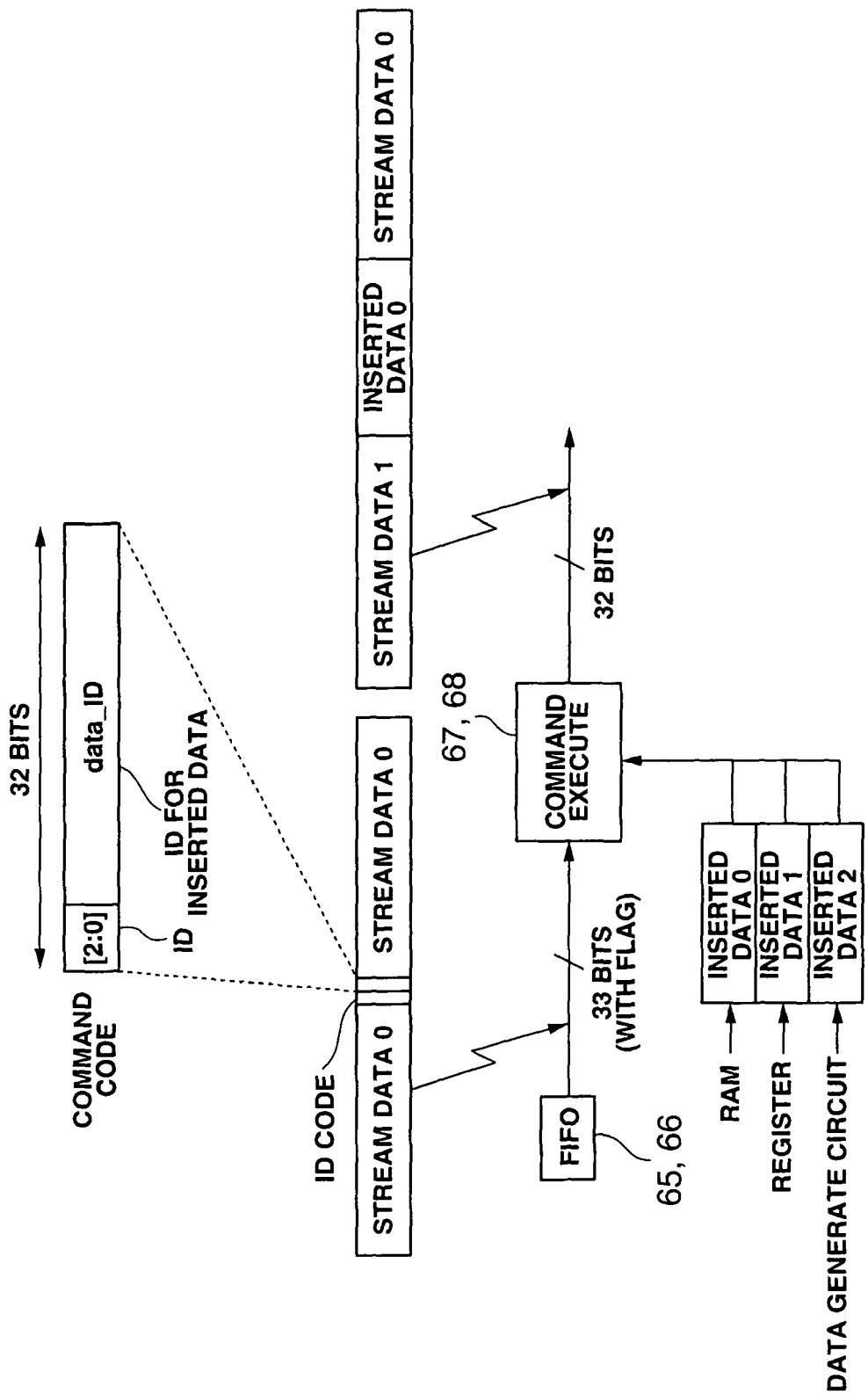
FIG. 25 explains an operation (data insertion) for inserting arbitrary data such as concurrent output time information or the like to an arbitrary position in a multiplexed stream.

FIG. 25 explains how the data inserting operation is done.

For the data inserting operation, the command insert circuit 63 inserts command data to a position where data in a multiplexed stream is to be inserted by executing a corresponding command instruction. In this case, the command code has stated therein a number indicating the data inserting operation as an ID, and a parameter such as information for identifying the type of data to be inserted (inserted data ID).

When command data indicating the data inserting operation is detected, each of the command execute circuits 67 and 68 deletes input command data, and inserts data stated in the inserted data ID to a position where the command data has been inserted. Then the command execute circuit outputs the resulted data. For example, each of the command execute circuits 67 and 68 inserts, to a position where the command data has been inserted, data generated by RAM, register or other data generate circuit, and outputs the resulted data.

As a result, it is possible to easily insert, to an arbitrary position in a multiplexed stream, data whose value will vary depending upon a timing of outputting time information or the like, for example.

As having been described in the foregoing, in the multiplexing apparatus and method according to the present invention, multiplexing instruction data having stated therein an order of multiplexing is generated, the generated data is stored into the memory, and data are multiplexed sequentially according to the multiplexing instruction data stored in the memory.

Thus, the multiplexing apparatus and method allow to lessen the burden of processing to the controller at the time of multiplexing.

In the multiplexing apparatus and method according to the present invention, multiplexing instruction data having stated therein an order of multiplexing and command instruction data having stated therein a predetermined data execution instruction are generated, stored into the memory, and data are multiplexed and processed sequentially according to the multiplexing instruction data and command instruction data stored in the memory.

Thus, the multiplexing apparatus and method allow to positively process data synchronously with a timing of outputting a multiplexed stream and do the data processing with an improved freedom of timing.

In the multiplexing apparatus and method according to the present invention, multiplexing instruction data having stated therein an order of multiplexing is generated, stored into the memory, and data are multiplexed sequentially according to the multiplexing instruction data stored in the memory. Further, in this multiplexing apparatus and method, a data amount of a data unit corresponding to the generated multiplexing instruction data is added to the count, and the data amount of output data unit is subtracted from the count.

Thus, the multiplexing apparatus and method allow to lessen the burden of processing to the controller at the time of multiplexing.

In the multiplexing apparatus and method according to the present invention, multiplexing instruction data having stated therein an order of multiplexing is generated, stored into the memory, and data are multiplexed sequentially according to the multiplexing instruction data stored in the memory. Further, in this multiplexing apparatus and method, the type of a multiplexed stream is stated in the multiplexing instruction data, and outputting is switched according to the stream type.

Thus, the multiplexing apparatus and method according to the present invention allow to output a plurality of multiplexed streams and do the data multiplexing by a circuit scaled down.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

What is claimed is:

1. A multiplexing apparatus which multiplexes a plurality of audio elementary data streams from an audio source and a plurality of video elementary data streams from a video source to generate one multiplexed stream as an initial transport stream which is not a remultiplexed transport stream, the multiplexing apparatus comprising:

encoders receiving base-band video data from a video source, receiving base-band audio data from an audio source, encoding the base-band video data into the video elementary data streams, encoding the base-band audio data into the audio elementary data streams, dividing the video elementary data streams into a plurality of video data units and dividing the audio elementary streams into a plurality of audio data units;

a memory which stores the plurality of video and audio data units that are composed of an arbitrary amount of said video and audio elementary data streams;

the controller calculating an order of multiplexing the video data units and the audio data units based on storage locations supplied by the encoders, generating the multiplexing instruction set of a plurality of multiplexing instruction data which state (a) the unit storage location, (b) number of bytes and (c) order of multiplexing of each data unit and storing the unit storage location, number of bytes and order of multiplexing as the multiplexing instruction set into the memory; and a multiplexed stream generator reading the multiplexing instruction set generated by the controller from the memory, generating one multiplexed stream by reading the data units from the memory in a predetermined order based upon the read multiplexing instruction set and outputting the data units corresponding to the multiplexing instruction set, wherein the multiplexing stream generator generates the multiplexed stream (a) without directly receiving the multiplexing instruction set from the controller and (b) without control of timing of instruction transfer by the controller.

2. A multiplexing apparatus which multiplexes a plurality of video elementary data streams from a video source and a plurality of audio elementary data streams from an audio source to generate one multiplexed stream as an initial transport stream which is not a remultiplexed transport stream, the multiplexing apparatus comprising:

encoders receiving base-band video data from a video source, receiving base-band audio data from an audio source, encoding the base-band video data into the video elementary data streams, encoding the base-band audio data into the audio elementary data streams, dividing the video elementary data streams into a plurality of video data units and dividing the audio elementary streams into a plurality of audio data units;

a memory which stores the plurality of video and audio data units that are composed of an arbitrary amount of said video and audio elementary data streams;

the controller calculating an order of multiplexing the video data units and audio data units based on storage locations supplied by the encoders, generating the multiplexing instruction set of a plurality of multiplexing instruction data which state (a) the unit storage location, (b) number of bytes and (c) order of multiplexing of each data unit while generating command instruction data having stated therein an instruction for execution of a data processing to be executed in an arbitrary position in the multiplexing instruction data, and storing the command instruction data and the unit storage location, number of bytes and order of multiplexing as the multiplexing instruction set into the memory;

a multiplexed stream generator reading the multiplexing instruction set from the memory, generating one multiplexed stream including the video and audio elementary data streams and command data by reading the data units and command instruction data from the memory in a predetermined order based upon the read multiplexing instruction set and outputting the data units corresponding to the multiplexing instruction set, after reading the multiplexing instruction set from the memory, or by outputting command data having stated therein the execution instruction stated in the command instruction data, after reading the command instruction data; and a command executing means which is supplied with a multiplexed stream output from the multiplexed stream generator and makes a processing corresponding to an instruction content stated in the command data when a data row in the multiplexed stream is command data, or outputs the multiplexed stream as it is when the data row in the input multiplexed stream is video and audio elementary data stream, wherein the multiplexing stream generator generates the multiplexed stream (a) without directly receiving the multiplexing instruction set from the controller and (b) without control of timing of instruction transfer by the controller.

3. The apparatus as set forth in claim 2, wherein:
the multiplexed stream generator outputs, synchronously with the multiplexed stream, an ID flag for identifying which data row in the multiplexed stream is command data or elementary data stream; and
the command executing means judges based on the ID flag whether the data row in the multiplexed stream is command data or elementary data stream.

4. The apparatus as set forth in claim 2, wherein:
the controller generates, when inserting stuffing data into an output multiplexed stream, command instruction data having stated therein an instruction for inserting the stuffing data and an amount of the stuffing data;

the multiplexed stream generator outputs, when the command instruction data has stated therein an instruction for inserting the stuffing data, the command data having stated therein the content stated in the command instruction data; and the command executing means inserts, when the command data has stated therein an instruction for inserting the stuffing data, stuffing data whose amount is stated in the command data to a position of the command data in the multiplexed stream.

5. The apparatus as set forth in claim 2, wherein:

the controller generates, when deleting data from an output multiplexed stream, command instruction data having stated therein a data delete instruction and data amount to be deleted;

the multiplexed stream generator outputs, when the command instruction data has stated therein an instruction for deletion of data, the command data having stated therein the content stated in the command instruction data; and the command executing means deletes, when the command data has stated therein an instruction for deletion of the data, an amount of data stated in the command data from a multiplexed stream next to the command data.

6. The apparatus as set forth in claim 2, wherein:

the controller generates, when inserting arbitrary data into an output multiplexed stream, command instruction data having stated therein an instruction for insertion of the arbitrary data;

the multiplexed stream generator outputs, when the command instruction data has stated therein an instruction for insertion of the arbitrary data, the command data having stated therein the content stated in the command instruction data; and the command executing means inserts, when the command data has stated therein an instruction for insertion of the arbitrary data, the arbitrary data stated in the command data to a position of the command data in the multiplexed stream.

7. The apparatus as set forth in claim 2, wherein:

the controller generates, when sending a timing acknowledgment in an arbitrary timing in an output multiplexed stream, command instruction data having stated therein an instruction for sending a timing acknowledgment;

the multiplexed stream generator outputs, when the command instruction data has stated therein an instruction for sending the timing acknowledgment, the command data having stated therein the content stated in the command instruction data; and the command executing means sends, when the command data has stated therein an instruction for sending the timing acknowledgment, the timing acknowledgment in a position of the command data in the multiplexed stream.

8. A multiplexing apparatus which multiplexes a plurality of video elementary data streams from a video source and a plurality of audio elementary data streams from an audio source to generate one multiplexed stream as an initial transport stream which is not a remultiplexed transport stream, the multiplexing apparatus comprising:

encoders receiving base-band video data from a video source, receiving base-band audio data from an audio source, encoding the base-band video data into the video elementary data streams, encoding the base-band audio data into the audio elementary data streams, dividing the video elementary data streams into a plurality of video data units and dividing the audio elementary streams into a plurality of audio data units;

a memory which stores the plurality of video and audio data units that are composed of an arbitrary amount of said video and audio elementary data streams;

a counting means for indicating a count which indicates a data occupancy of the memory;

the controller calculating an order of multiplexing the video data units and audio data units based on storage locations supplied by the encoders, generating the multiplexing instruction set of a plurality of multiplexing instruction data which state (a) the unit storage location, (b) the number of bytes and (c) order of multiplexing of each data unit and storing the unit storage location, number of bytes and order of multiplexing as the multiplexing instruction set into the memory; and a multiplexed stream generator reading the multiplexing instruction set from the memory, generating one multiplexed stream by reading the data units from the memory in a predetermined order based upon the read multiplexing instruction set and outputting the data units corresponding to the multiplexing instruction set;

the controller adding a data amount of a data unit corresponding to the multiplexing instruction data to the count; and the counting means subtracting the data amount of output data unit from the count, wherein the multiplexing stream generator generates the multiplexed stream (a) without directly receiving the multiplexing instruction set from the controller and (b) without control of timing of instruction transfer by the controller.

9. The apparatus as set forth in claim 8, wherein:

the memory is divided into a plurality of storage areas correspondingly to the types of the elementary data streams and the elementary data streams is stored into corresponding storage areas;

the counting means holds a plurality of counts corresponding to the storage areas in the memory;

the controller adds the data amount of a data unit corresponding to the multiplexing instruction data to a count corresponding to a storage area in which the data unit is stored; and the counting means subtracts the data amount of data unit output from the memory from a count corresponding to the storage area in which the data unit is stored.

10. A multiplexing apparatus which multiplexes a plurality of video elementary data streams from a video source and a plurality of audio elementary data streams from an audio source to generate a plurality of multiplexed streams as an initial transport stream which is not a remultiplexed transport stream, the multiplexing apparatus comprising:

encoders receiving base-band video data from a video source, receiving base-band audio data from an audio source, encoding the base-band video data into the video elementary data streams, encoding the base-band audio data into the audio elementary data streams, dividing the video elementary data streams into a plurality of video data units and dividing the audio elementary streams into a plurality of audio data units;

a memory which stores the plurality of video and audio data units that are composed of arbitrary amounts of said video and audio elementary data streams;

the controller calculating an order of multiplexing the video data units and audio data units based on storage locations supplied by the encoders, generating the multiplexing instruction set of a plurality of multiplexing instruction data which state (a) the unit storage location, (b) a number of bytes and (c) order of multiplexing of each data unit and storing the unit storage location, number of bytes and order of multiplexing as the multiplexing instruction set into the memory; and a multiplexed stream generator generating a plurality of multiplexed streams by reading the data units in a predetermined order based upon reading the multiplexing instruction set from the memory, and outputting the data units corresponding to the multiplexing instruction set;

the controller stating, in the multiplexing instruction data, the type of a multiplexed stream resulted from multiplexing data units corresponding to the generated multiplexing instruction data; and the multiplexed stream generator generating the plurality of multiplexed streams by switching the outputting of the data unit read correspondingly to the multiplexed stream type stated in the multiplexing instruction data, wherein the multiplexing stream generator generates the multiplexed stream (a) without directly receiving the multiplexing instruction set from the controller and (b) without control of timing of instruction transfer by the controller.

11. A multiplexing method in which a plurality of video elementary data streams from a video source and a plurality of audio elementary streams from an audio source are multiplexed to generate one multiplexed stream as an initial transport stream which is not a remultiplexed transport stream, the multiplexing method comprising the steps of:

receiving base-band video data from a video source, receiving base-band audio data from an audio source, encoding the base-band video data into the plurality of video elementary data streams, encoding the base-band audio data into the plurality of audio elementary data streams, dividing each said elementary data streams into a plurality of data units that are composed of an arbitrary amount of said elementary data stream and storing said data units into a memory;

calculating an order of multiplexing video data units and audio data units based on storage locations, generating a multiplexing instruction set which state (a) the unit storage location, (b) number of bytes and (c) order of multiplexing of each said data unit and storing the unit storage location, number of bytes and order of multiplexing as the multiplexing instruction set into the memory; and reading the multiplexing instruction set, generating a multiplexed stream by reading the data units from the memory in a predetermined order based upon the read multiplexing instruction set and outputting the data units corresponding to the multiplexing instruction set, wherein a multiplexer generates the multiplexed stream (a) without directly receiving the multiplexing instruction set from a controller and (b) without control of timing of instruction transfer by the controller.

12. A multiplexing method in which a plurality of video elementary data streams from a video source and a plurality of audio elementary data streams from an audio source are multiplexed to generate one multiplexed stream as an initial transport stream which is not a remultiplexed transport stream, the multiplexing method comprising the steps of:

receiving base-band video data from a video source, receiving base-band audio data from an audio source, encoding the base-band video data into the plurality of video elementary data streams, encoding the base-band audio data into the plurality of audio elementary data streams, dividing each elementary data streams into a plurality of data units that are composed of an arbitrary amount of the elementary data stream and storing said data units into a memory;

calculating an order of multiplexing video data units and audio data units based on storage locations, generating a multiplexing instruction set which state (a) the unit storage location, (b) number of bytes and (c) order of multiplexing of each said data unit while generating command instruction data having stated therein an instruction for execution of a data processing to be executed in an arbitrary position in the multiplexing instruction data, and storing the command instruction data and the unit storage location, number of bytes and order of multiplexing as the multiplexing instruction set into the memory;

reading the multiplexing instruction set, generating a multiplexed stream including the video and audio elementary data streams and command data by reading the data units and command instruction data from the memory in a predetermined order based upon the read multiplexing instruction set and outputting the data units corresponding to the multiplexing instruction set, after reading the multiplexing instruction set, or by outputting command data having stated therein the execution instruction stated in the command instruction data, after reading the command instruction data; and being supplied with a multiplexed stream output from the multiplexed stream generating means and making a processing corresponding to an instruction content stated in the command data when a data row in the multiplexed stream is command data, or outputting the multiplexed stream as it is when the data row in the multiplexed stream is video and audio elementary data stream, wherein a multiplexer generates the multiplexed stream (a) without directly receiving the multiplexing instruction set from a controller and (b) without control of timing of instruction transfer by the controller.

13. The method as set forth in claim 12, further comprising the steps of:

synchronously outputting an ID flag, for identifying which data row in the multiplexed stream is command data or elementary data stream, with the multiplexed stream; and determining based on the ID flag whether the data row in the multiplexed stream is command data or elementary data stream.

14. The method as set forth in claim 12, further comprising the steps of:

when inserting stuffing data into an output multiplexed stream, generating command instruction data having stated therein an instruction for inserting the stuffing data and an amount of the stuffing data;

when the command instruction data has stated therein an instruction for inserting the stuffing data, outputting the command data having stated therein the content stated in the command instruction data; and when the command data has stated therein an instruction for inserting the stuffing data, inserting stuffing data whose amount is stated in the command data into a position of the command data in the multiplexed stream.

15. The method as set forth in claim 12, further comprising the steps of:

when deleting data from an output multiplexed stream, generating command instruction data having stated therein a data delete instruction and data amount to be deleted;

when the command instruction data has stated therein an instruction for deletion of data, outputting the command data having stated therein the content stated in the command instruction data; and when the command data has stated therein an instruction for deletion of the data, deleting an amount of data stated in the command data from a multiplexed stream next to the command data.

16. The method as set forth in claim 12, further comprising the steps of:

when inserting arbitrary data into an output multiplexed stream, generating command instruction data having stated therein an instruction for insertion of the arbitrary data;

when the command instruction data has stated therein an instruction for insertion of the arbitrary data, outputting the command data having stated therein the content stated in the command instruction data; and when the command data has stated therein an instruction for insertion of the arbitrary data, inserting the arbitrary data stated in the command data into a position of the command data in the multiplexed stream.

17. The method as set forth in claim 12, further comprising the steps of:

when sending a timing acknowledgment in an arbitrary timing in an output multiplexed stream, generating command instruction data having stated therein an instruction for sending a timing acknowledgment;

when the command instruction data has stated therein an instruction for sending the timing acknowledgment, outputting the command data having stated therein the content stated in the command instruction data; and when the command data has stated therein an instruction for sending the timing acknowledgment, sending the timing acknowledgment in a position of the command data in the multiplexed stream.

18. A multiplexing method in which a plurality of video elementary data streams from a video source and a plurality of audio elementary data streams from an audio source are multiplexed to generate one multiplexed stream as an initial transport stream which is not a remultiplexed transport stream, the multiplexing method comprising the steps of:

receiving base-band video data from a video source, receiving base-band audio data from an audio source, encoding the base-band video data into the plurality of video elementary data streams, encoding the base-band audio data into the plurality of audio elementary data streams, dividing each elementary data streams into a plurality of data units that are composed of an arbitrary amount of the elementary data stream and storing the data units into a memory;

calculating an order of multiplexing video data units and audio data units based on storage locations, generating a multiplexing instruction set which state (a) the unit storage location, (b) number of bytes and (c) order of multiplexing of each said data unit and storing the unit storage location, number of bytes and order of multiplexing as the multiplexing instruction set into the memory; and reading the multiplexing instruction set, generating a multiplexed stream by reading the data units from the memory in a predetermined order based on the read multiplexing instruction set and outputting the data units corresponding to the multiplexing instruction set;

in the instruction generating step, adding the data amount of a data unit corresponding to the multiplexing instruction set to a count in a counter indicating data occupancy of the memory; and subtracting the data amount of data unit output from the memory from the count, wherein a multiplexer generates the multiplexed stream (a) without directly receiving the multiplexing instruction set from a controller and (b) without control of timing of instruction transfer by the controller.

19. The method as set forth in claim 18, further comprising the steps of:

dividing the memory in a plurality of storage areas correspondingly to the types of the elementary data streams and storing the supplied elementary data streams into corresponding storage areas;

holding a plurality of counts corresponding to the storage areas in the memory in the counter;

adding the data amount of a data unit corresponding to the instruction set to a count corresponding to a storage area in which the data unit is stored; and subtracting the data amount of data unit output from the memory from a count corresponding to the storage area in which the data unit is stored.

20. A multiplexing method in which a plurality of video elementary data streams from a video source and a plurality of audio elementary data streams from an audio source are multiplexed to generate a plurality of multiplexed streams as initial transport streams which are not a remultiplexed transport streams, the multiplexing method comprising the steps of:

receiving base-band video data from a video source, receiving base-band audio data from an audio source, encoding the base-band video data into the plurality of video elementary data streams, encoding the base-band audio data into the plurality of audio elementary data streams, dividing each elementary data streams into a plurality of data units that are composed of an arbitrary amount of the elementary data stream and storing the data units into a memory;

calculating an order of multiplexing video data units and audio data units based on storage locations, generating a multiplexing instruction set which state (a) the unit storage location, (b) number of bytes and (c) order of multiplexing of each said data unit and storing the unit storage location, number of bytes and order of multiplexing as the multiplexing instruction set into the memory;

stating, in the multiplexing instruction set, the type of a multiplexed stream resulted from multiplexing data units corresponding to the multiplexing instruction set; and reading the multiplexing instruction set, generating a plurality of multiplexed streams by reading the data units from the memory in a predetermined order based upon the read multiplexing instruction set and outputting the data units corresponding to the multiplexing instruction set and switching the outputting of the data unit correspondingly to the multiplexed stream type stated in the multiplexing instruction set, wherein a multiplexer generates the multiplexed stream (a) without directly receiving the multiplexing instruction set from a controller and (b) without control of timing of instruction transfer by the controller.

21. A multiplexer for multiplexing a plurality of video elementary data streams from a video source and a plurality of audio elementary data streams from an audio source to generate a multiplexed stream as an initial transport stream which is not a remultiplexed transport stream, the multiplexer comprising:
- a bus;
- encoders receiving base-band video data from a video source, receiving base-band audio data from an audio source, encoding the base-band video data into the video elementary data streams, encoding the base-band audio data into the audio elementary data streams, dividing the video elementary data streams into a plurality of video data units and dividing the audio elementary streams into a plurality of audio data units;
- a data memory storing the plurality of video and audio elementary data streams;
- an instruction memory storing a multiplexing instruction set input thereto by a controller;
- a direct memory access (DMA) circuit, connected to the bus, directly accessing the plurality of video and audio elementary data streams stored in the data memory and accessing the multiplexing instruction set stored in the instruction memory, wherein each video and audio elementary data streams is stored as data units in the data memory, and the multiplexing instruction set state (a) location of data units in the data memory, (b) number of bytes and (c) an order of multiplexing the corresponding data units;
- wherein the multiplexer is operable to generate a multiplexed stream by reading multiplexing instruction set with said DMA circuit from the instruction memory, by reading data units from the data memory with said DMA circuit in a predetermined order from storage locations based upon the read multiplexing instruction set, and by outputting the read data units as said multiplexed stream,
- wherein the DMA circuit generates the multiplexed stream (a) without directly receiving the multiplexing instruction set from the controller and (b) without control of timing of instruction transfer by the controller.

22. The multiplexer of claim 21, wherein the instruction set includes command instruction data having stated therein an instruction for data processing to be executed in an arbitrary position in the instruction set, and the multiplexer is further operable to output command data having stated therein the instruction stated in the command instruction data, when having read the command instruction data;
- the multiplexer further including a command executing means which is supplied with the generated multiplexed stream and which performs processing corresponding to an instruction stated in the command data when the data in the input multiplexed stream is command data, or outputs the input multiplexed stream as it is when the data in the input multiplexed stream is elementary data stream.

23. The multiplexer of claim 22, wherein:
- the multiplexer outputs, synchronously with the multiplexed stream supplied to the command executing means, an ID flag for identifying if the data in the multiplexed stream is command data or elementary data stream; and
- the command executing means determines based on the ID flag, if the data in the supplied multiplexed stream is command data or elementary data stream.

24. The multiplexer of claim 22, wherein:
- when the command instruction data has stated therein an instruction for inserting stuffing data and amount of the stuffing data, wherein the generated multiplexed stream outputs command data having stated therein the content stated in the command instruction data, the command executing means inserts, when the command data has stated therein an instruction for inserting the stuffing data, stuffing data whose amount is stated in the command data to a position of the command data in the multiplexed stream.

25. The multiplexer of claim 22, wherein:
- when the command instruction data has stated therein a data delete instruction and data amount to be deleted, the generated multiplexed stream outputs command data having stated therein the content stated in the command instruction data, and the command executing means deletes, when the command data has stated therein an instruction for deletion of the data, an amount of data stated in the command data from a multiplexed stream next to the command data.

26. The multiplexer of claim 22, wherein:
- when the command instruction data has stated therein an instruction for insertion of the arbitrary data, the generated multiplexed stream means outputs the command data having stated therein the content stated in the command instruction data, and the command executing means inserts, when the command data has stated therein an instruction for insertion of the arbitrary data, the arbitrary data stated in the command data to a position of the command data in the multiplexed stream.

27. The multiplexer of claim 22, wherein:
- when the command instruction data has stated therein an instruction for sending a timing acknowledgement, the generated multiplexed stream means outputs the command data having stated therein the content stated in the command instruction data, and the command executing means sends, when the command data has stated therein an instruction for sending the timing acknowledgement, the timing acknowledgement in a position of the command data in the multiplexed stream.

28. The multiplexer according to claim 21, further comprises:
- a counting means for indicating a count which indicates a data occupancy of the data memory;
- wherein the data amount of a data unit corresponding to the instruction set is added to the count; and
- the counting means is operable to subtract the data amount of output data unit from the count.

29. The multiplexer of claim 28, wherein:
- the data memory is divided into a plurality of storage areas corresponding to the types of the elementary data streams and the supplied elementary data streams are stored into corresponding storage areas;
- the counting means holds a plurality of counts corresponding to the storage areas in the data memory;
- the data amount of a data unit corresponding to the instruction set is added to a count corresponding to a storage area in which the data unit is stored; and
- the counting means subtracts the data amount of data unit output from the data memory from a count corresponding to the storage area in which the data unit is stored.

30. The multiplexer according to claim 21, wherein:
- the multiplexer is operable to generate a plurality of multiplexed streams by reading the instruction set from the instruction memory, by reading the data units sequentially from the storage locations stated in the read instruction set, and by outputting the read data units;
- the instruction set states the type of a multiplexed stream resulted from multiplexing data units corresponding to the instruction set; and
- the multiplexer is operable to generate the plurality of multiplexed streams by switching the outputting of the read data unit corresponding to the multiplexed stream type stated in the read instruction set.

31. An apparatus for multiplexing a plurality of video elementary data streams from a video source and a plurality of audio elementary data streams from an audio source to generate a multiplexed stream as an initial transport stream which is not a remultiplexed transport stream, the apparatus comprising:
a bus;
encoders receiving base-band video data from a video source, receiving base-band audio data from an audio source, encoding the base-band video data into the video elementary data streams, encoding the base-band audio data into the audio elementary data streams, dividing the video elementary data streams into a plurality of video data units and dividing the audio elementary streams into a plurality of audio data units;
a data memory linked to the bus;
an instruction memory linked to the bus;
a CPU, linked to the bus, generating the multiplexing instruction set having stated therein (a) a unit storage location in the data memory of a data unit formed from an elementary stream, (b) number of bytes and (c) an order of multiplexing the data units and storing the unit storage location, number of bytes and order of multiplexing as the generated multiplexing instruction set into the instruction memory; and
a multiplexer reading the multiplexing instruction set from the instruction memory and multiplexing the plurality of video elementary data streams and the plurality of audio elementary data stream to generate a multiplexed stream, the multiplexer comprising:
a direct memory access (DMA) circuit for connection to the bus for directly accessing the plurality of video and audio elementary data streams stored in the data memory and accessing the multiplexing instruction set stored in the instruction memory, wherein each video and audio elementary data streams is stored as data units in the data memory, and the multiplexing instruction set state the storage location of data units in the data memory, the number of bytes and the order of multiplexing the corresponding data units;
wherein the multiplexer is operable to generate a multiplexed stream by reading the multiplexing instruction set with said DMA circuit from the instruction memory, by reading data units from storage locations in a predetermined order stated in the read multiplexing instruction set, and by outputting the read data units as said multiplexed stream, and
wherein the direct memory access (DMA) circuit is connected to said bus for directly accessing the plurality of video and audio elementary data streams stored in the data memory and directly accessing the multiplexing instruction data stored in the instruction memory,
wherein the DMA circuit generating the multiplexed stream (a) without directly receiving the multiplexing instruction set from the CPU and (b) without control of timing of instruction transfer by the CPU.

32. The apparatus of claim 31, wherein:
the CPU generates the instruction set and command instruction data having stated therein an instruction for data processing to be executed in an arbitrary position in the instruction set, and stores the generated instruction set and command instruction data into the instruction memory;
the multiplexer generates a multiplexed stream including the elementary data streams and command data by reading the instruction set and command instruction data sequentially from the instruction memory, reading the data units from the storage locations in the predetermined order stated in the read instruction set and outputting the read data units, when having read the instruction set, or outputting command data having stated therein the execution instruction stated in the command instruction data, when having read the command instruction data; and
the apparatus further including a command executing means which is supplied with the multiplexed stream and performs processing corresponding to an instruction content stated in the command data when the data row in the input multiplexed stream is command data, or outputs the input multiplexed stream as it is when the data row in the input multiplexed stream is elementary data stream.

33. The apparatus of claim 32, wherein:
the multiplexer outputs, synchronously with the multiplexed stream, an ID flag for identifying if the data in the multiplexed stream is command data or elementary data stream; and
the command executing means determines, based on the ID flag, if the data in the supplied multiplexed stream is command data or elementary data stream.

34. The apparatus of claim 32, wherein:
the CPU generates, when inserting stuffing data into an output multiplexed stream, command instruction data having stated therein an instruction for inserting the stuffing data and amount of the stuffing data;
the multiplexer outputs, when the read command instruction data has stated therein an instruction for inserting the stuffing data, the command data having stated therein the content stated in the command instruction data; and
the command executing means inserts, when the command data has stated therein an instruction for inserting the stuffing data, stuffing data whose amount is stated in the command data to a position of the command data in the multiplexed stream.

35. The apparatus of claim 32, wherein:
the CPU generates, when deleting data from an output multiplexed stream, command instruction data having stated therein a data delete instruction and data amount to be deleted;
the multiplexer outputs, when the read command instruction data has stated therein an instruction for deletion of data, the command data having stated therein the content stated in the command instruction data; and
the command executing means deletes, when the command data has stated therein an instruction for deletion of the data, an amount of data stated in the command data from a multiplexed stream next to the command data.

36. The apparatus of claim 32, wherein:
the CPU generates, when inserting arbitrary data into an output multiplexed stream, command instruction data having stated therein an instruction for insertion of the arbitrary data;
the multiplexer outputs, when the read command instruction data has stated therein an instruction for insertion of the arbitrary data, the command data having stated therein the content stated in the command instruction data; and
the command executing means inserts, when the command data has stated therein an instruction for insertion of the arbitrary data, the arbitrary data stated in the command data to a position of the command data in the multiplexed stream.

37. The apparatus of claim 32, wherein:
the CPU generates, when sending a timing acknowledgement in an arbitrary timing in an output multiplexed stream, command instruction data having stated therein an instruction for sending a timing acknowledgement;
the multiplexer outputs, when the read command instruction data has stated therein an instruction for sending the timing acknowledgement, the command data having stated therein the content stated in the command instruction data; and
the command executing means sends, when the command data has stated therein an instruction for sending the timing acknowledgement, the timing acknowledgement in a position of the command data in the multiplexed stream.

38. The apparatus according to claim 31, further comprising:
a counting means in the multiplexer for indicating a count which indicates a data occupancy of the memory;
wherein the CPU adds the data amount of a data unit corresponding to the generated instruction set to the count; and
wherein the counting means subtracts the data amount of output data unit from the count.

39. The apparatus of claim 38, wherein:
the data memory is divided in a plurality of storage areas corresponding to the types of the elementary data streams and the supplied elementary data streams are stored into corresponding storage areas;
the counting means holds a plurality of counts corresponding to the storage areas in the data memory;
the CPU adds the data amount of a data unit corresponding to the generated instruction set to a count corresponding to a storage area in which the data unit is stored; and
the counting means subtracts the data amount of data unit output from the data memory from a count corresponding to the storage area in which the data unit is stored.

40. The apparatus according to claim 31, wherein:
the multiplexer generates a plurality of multiplexed streams by reading the instruction set sequentially from the instruction memory, reading the data units from the storage locations stated in the read instruction set and by outputting the read data units;
the CPU states, in the instruction set, the type of a multiplexed stream resulted from multiplexing data units corresponding to the generated instruction set; and
the multiplexer generates the plurality of multiplexed streams by switching the outputting of the read data unit according to the multiplexed stream type stated in the read instruction set.

41. A method for multiplexing a plurality of video elementary data streams from a video source and a plurality of audio elementary data streams from an audio source to generate a multiplexed stream as an initial transport stream which is not a remultiplexed transport stream, the method comprising the steps of:
receiving base-band video data from a video source, receiving base-band audio data from an audio source, encoding the base-band video data into the plurality of video elementary data streams, encoding the base-band audio data into the plurality of audio elementary data streams, and storing the plurality of video and audio elementary data streams in a data memory;
generating, by a CPU, a multiplexing instruction set having stated therein (a) a unit storage location in the data memory of a data unit formed from an elementary stream, (b) number of bytes and (c) an order of multiplexing the data units and storing the unit storage location, number of bytes and order of multiplexing as the generated multiplexing instruction set into an instruction memory;
using a direct memory access (DMA) circuit in a multiplexer for directly accessing the plurality of elementary data streams stored in the data memory and the multiplexing instruction set stored in the instruction memory; and
generating a multiplexed stream in the multiplexer by reading the multiplexing instruction set with said DMA circuit from the instruction memory, by reading data units in a predetermined order from storage locations stated in the read multiplexing instruction set, and by outputting the read data units as said multiplexed stream,
wherein said DMA circuit generates said multiplexed stream (a) without directly receiving the multiplexing instruction set from the CPU and (b) without control of timing of instruction transfer by the CPU.

42. The method of claim 41, further comprising the steps of:
generating command instruction data having stated therein an instruction for execution of a data processing to be executed in an arbitrary position in the instruction set, and storing the generated instruction set and command instruction data into the instruction memory;
generating one multiplexed stream including the elementary data streams and command data by reading the instruction set and command instruction data from the memory, reading the data units in a predetermined order from the storage locations stated in the read instruction set and outputting the read data units, when having read the instruction set, or outputting command data having stated therein the execution instruction stated in the command instruction data, when having read the command instruction data; and
processing the multiplexed stream according to an instruction content stated in the command data when the data in the multiplexed stream is command data, or outputting the multiplexed stream as it is when the data in the multiplexed stream is elementary data stream.

43. The method of claim 42, wherein:
an ID flag for identifying if the data in the multiplexed stream is command data or elementary data stream is provided synchronously with the multiplexed stream; and
determining based on the ID flag if the data in the multiplexed stream is command data or elementary data stream.

44. The method of claim 42, wherein:
when inserting stuffing data into the multiplexed stream, there is generated command instruction data having stated therein an instruction for inserting the stuffing data and amount of the stuffing data;
when the read command instruction data has stated therein an instruction for inserting the stuffing data, outputting the command data having stated therein the content stated in the command instruction data; and
when the command data has stated therein an instruction for inserting the stuffing data, inserting, stuffing data, whose amount is stated in the command data, at the position of the command data in the multiplexed stream.

45. The method of claim 42, wherein:

when deleting data from the multiplexed stream, generating command instruction data having stated therein a data delete instruction and data amount to be deleted;

when the read command instruction data has stated therein an instruction for deletion of data, outputting the command data having stated therein the content stated in the command instruction data; and when the command data has stated therein an instruction for deletion of the data, deleting an amount of data, stated in the command data, from the multiplexed stream next to the command data.

46. The method of claim 42, wherein:

when inserting arbitrary data into the multiplexed stream, generating command instruction data having stated therein an instruction for insertion of the arbitrary data;

when the read command instruction data has stated therein an instruction for insertion of the arbitrary data, outputting the command data having stated therein the content stated in the command instruction data; and when the command data has stated therein an instruction for insertion of the arbitrary data, inserting the arbitrary data stated in the command data to a position of the command data in the multiplexed stream.

47. The method of claim 42, wherein:

when sending a timing acknowledgement in an arbitrary timing in the multiplexed stream, generating command instruction data having stated therein an instruction for sending a timing acknowledgement;

when the read command instruction data has stated therein an instruction for sending the timing acknowledgement, outputting the command data having stated therein the content stated in the command instruction data; and when the command data has stated therein an instruction for sending the timing acknowledgement, sending the timing acknowledgement in a position of the command data in the multiplexed stream.

48. The method according to claim 41, further comprising the steps of:

adding the data amount of a data unit corresponding to the generated instruction set to a count in a counter indicating data occupancy of the data memory; and subtracting the data amount of data unit output from the data memory from the count.

49. The method of claim 48, wherein:

dividing the data memory in a plurality of storage areas corresponding to the types of the elementary data streams and storing the supplied elementary data streams into corresponding storage areas;

holding a plurality of counts corresponding to the storage areas in the data memory;

adding the data amount of a data unit corresponding to the generated instruction set to a count corresponding to a storage area in which the data unit is stored; and subtracting the data amount of data unit output from the data memory from a count corresponding to the storage area in which the data unit is stored.

50. The method according to claim 41, further comprising the steps of:

stating, in the instruction set, the type of a multiplexed stream resulted from multiplexing data units corresponding to the generated instruction set; and generating a plurality of multiplexed streams by reading the instruction set from the instruction memory, reading the data units in the predetermined order from the storage locations stated in the read instruction set, and by outputting the read data units and by switching the outputting of the read data units according to the multiplexed stream type stated in the read instruction set.

* * * * *